(12) United States Patent
Kim et al.

(10) Patent No.: US 11,457,403 B2
(45) Date of Patent: Sep. 27, 2022

(54) METHOD AND USER EQUIPMENT FOR PERFORMING ACCESS CONTROL IN 5GS

(71) Applicant: LG ELECTRONICS INC., Seoul (KR)

(72) Inventors: Jaehyun Kim, Seoul (KR); Myungjune Youn, Seoul (KR); Sangmin Park, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 17/041,188

(22) PCT Filed: Feb. 7, 2019

(86) PCT No.: PCT/KR2019/001524
§ 371 (c)(1),
(2) Date: Sep. 24, 2020

(87) PCT Pub. No.: WO2019/216526
PCT Pub. Date: Nov. 14, 2019

(65) Prior Publication Data
US 2021/0029628 A1 Jan. 28, 2021

Related U.S. Application Data

(60) Provisional application No. 62/668,792, filed on May 8, 2018.

(51) Int. Cl.
*H04W 4/00* (2018.01)
*H04W 48/18* (2009.01)
(Continued)

(52) U.S. Cl.
CPC ........... *H04W 48/18* (2013.01); *H04W 48/08* (2013.01); *H04W 76/18* (2018.02); *H04W 76/20* (2018.02); *H04W 84/042* (2013.01)

(58) Field of Classification Search
CPC ..... H04W 76/00; H04W 76/10; H04W 76/11; H04W 76/18; H04W 76/19; H04W 88/18;
(Continued)

(56) References Cited

U.S. PATENT DOCUMENTS

| 2017/0303259 | A1 | 10/2017 | Lee et al. | |
| 2019/0098537 | A1* | 3/2019 | Qiao | H04W 36/38 |
| 2020/0367090 | A1* | 11/2020 | Zhang | H04W 76/32 |

FOREIGN PATENT DOCUMENTS

| WO | 2018008980 | 1/2018 |
| WO | 2018064479 | 4/2018 |

OTHER PUBLICATIONS

3GPP; TSGCNT; Non-Access-Stratum (NAS) protocol for 5G System (5GS); Stage 3 (Release 15), 3GPP TS 24.501 V1.0.0, Mar. 15, 2018, See Sections 6.2.9, 6.4.1.2, 6.4.1.3, 6.4.1.4.1, 6.4.2.2, 6.4.2.4; and figures 6.4.1.2.1, 6.4.2.2.1.
(Continued)

*Primary Examiner* — Huy C Ho
(74) *Attorney, Agent, or Firm* — Dentons US LLP

(57) ABSTRACT

Disclosed in the present specification is a method by which a user equipment (UE) performs access control. The method can comprise the steps of: transmitting a protocol data unit (PDU) session establishment or modification request message; and receiving a PDU session establishment or modification rejection message. The rejection message can comprise information on a backoff timer and session network slice selection assistance information (S-NSSAI). The method can comprise the steps of: driving the backoff timer while being linked with the S-NSSAI; and performing access control on the basis of the S-NSSAI.

14 Claims, 14 Drawing Sheets

(51) Int. Cl.
*H04W 76/20* (2018.01)
*H04W 76/18* (2018.01)
*H04W 48/08* (2009.01)
*H04W 84/04* (2009.01)

(58) Field of Classification Search
CPC ..... H04W 92/02; H04W 92/00; H04W 92/04; H04W 92/045; H04W 92/06; H04W 92/12; H04W 92/10; H04W 92/14; H04W 76/20; H04W 48/18; H04W 48/08; H04W 48/02; H04W 48/16; H04W 48/17; H04L 67/14; H04L 67/141; H04L 67/142; H04L 67/143; H04L 67/145
USPC ......................................................... 370/329
See application file for complete search history.

(56) References Cited

OTHER PUBLICATIONS

3GPP; TSGSA; System Architecture for the 5G System; Stage 2 (Release 15), 3GPP TS 23.501 V15.1.0, Mar. 28, 2018; See Sections 5.19.7.3, 5.19.7.4.

* cited by examiner

METHOD AND USER EQUIPMENT FOR PERFORMING ACCESS CONTROL IN 5GS

This application is the National Stage filing under 35 U.S.C. 371 of International Application No. PCT/KR2019/001524, filed on Feb. 7, 2019, which claims the benefit of U.S. Provisional Application No. 62/668,792 filed on May 8, 2018, the contents of which are all hereby incorporated by reference herein in their entirety.

BACKGROUND OF THE DISCLOSURE

Field of the Disclosure

The present disclosure relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in |

TABLE 1-continued

| REFERENCE POINT | DESCRIPTION |
|---|---|
| | idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an Exemplary Diagram Illustrating a Predicted Structure of a Next Generation Mobile Communication in Terms of a Node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, the UE may access two data networks through multi PDU sessions.

FIG. 3 is an exemplary diagram illustrating an architecture for supporting a concurrent access through two data networks.

FIG. 3 illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 4a Illustrates an Example of Architecture for Implementing Network Slicing.

As may be noticed with reference to FIG. 4a, the core network (CN) may be divided into several slice instances. Each slice instance may include one or more of a CP function node and a UP function node.

Each UE may use a network slice instance relevant to its service through the RAN.

Different from FIG. 4a, each slice instance may share one or more of the CP function node and the UP function node with other slice instance. This feature will be described with reference to FIG. 4 as follows.

FIG. 4b Illustrates Another Example of Architecture for Implementing Network Slicing.

Reference to FIG. 4b, a plurality of UP function nodes are clustered, and a plurality of CP function nodes are also clustered.

And referring to FIG. 4b, slice instance #1 within the core network (which is also called instance #1) includes a first cluster of UP function nodes. And the slice instance #1 shares the cluster of CP function nodes with slice #2 (which is also called instance #2). The slice instance #2 includes a second cluster of UP function nodes.

The NSSF shown in the figure selects a slice (or instance) capable of accommodating UE services.

The UE shown in the figure may use service #1 through slice instance #1 selected by the NSSF and may also use service #2 through slice instance #2 selected through the NSSF.

<Roaming in the Next-Generation Mobile Communication Network>

Meanwhile, when the UE roams to a visited network, for example, a Visited Public Land Mobile Network (VPLMN), there are two methods for processing a signaling request from the UE. The first method, Local Break Out (LBO) method, processes a signaling request from the UE in the visited network. According to the second method, Home Routing (HR) method, the visited network transmits a signaling request from the UE to the home network of the UE.

FIG. 5a is an Exemplary Diagram Illustrating an Architecture to which a Local Breakout (LBO) Scheme is Applied During Roaming, and FIG. 5b is an Exemplary Diagram Illustrating an Architecture to which a Home Routed (HR) Scheme is Applied During Roaming.

As shown in FIG. 5a, in the architecture to which the LBO scheme is applied, user data are transmitted to a data network within the VPLMN. To this end, the PCF within the VPLMN performs interaction with the AF to generate a PCC rule for providing a service within the VPLMN. The PCF node within the VPLMN generates a PCC rule based on a policy set internally according to a roaming agreement with a Home Public Land Mobile Network (HPLMN) service provider.

As shown in FIG. 5b, in the architecture to which the HR scheme is applied, UE data is transmitted to the data network within the HPLMN.

Meanwhile, no method has been proposed yet, which may deal with a situation when the next-generation network encounters congestion.

SUMMARY

Accordingly, the present disclosure is intended to solve the problems described above.

To achieve the objective above, one disclosure of the present disclosure provides a method for performing access control by a User Equipment (UE). The method may include transmitting a Protocol Data Unit (PDU) session establishment or modification request message; and receiving a PDU session establishment or modification reject message. The reject message may include information on a backoff timer and Session Network Slice Selection Assistance Information (S-NSSAI). The method may include operating the backoff timer in association with the S-NSSAI; and performing access control based on the S-NSSAI.

The reject message may further include information on a Data Network Name (DNN).

The backoff timer may be operated in further association with the DNN. And the access control may be performed in further consideration of the DNN.

The method may further include receiving a UE Route Selection Policy (URSP). The URSP may include information on a target network of access control.

The information may indicate whether a target network of the access control is a Home Public Land Mobile Network (HPLMN) or a Visited PLMN (VPLMN).

The information may indicate whether a target network node of the access control is a Home Session Management Function (H-SMF) or a Visited SMF (V-SMF).

The reject message may further include HPLMN or VPLMN information.

The reject message may further include information about whether a target network node of the access control is an H-SMF or a V-SMF.

To achieve the objective described above, one disclosure of the present disclosure provides a User Equipment (UE) performing access control. The UE may comprises a transceiver; and a processor controlling the transceiver. The processor may be configured to perform a process for transmitting a Protocol Data Unit (PDU) session establishment or modification request message and a process for receiving a PDU session establishment or modification reject message. Here, the reject message may include information on a backoff timer and Session Network Slice Selection Assistance Information (S-NSSAI). The processor may configured to perform a process for operating the backoff timer in association with the S-NSSAI and a process for performing access control based on the S-NSSAI.

According to the disclosure of the present disclosure, the problem of the conventional technology described above may be solved.

DESCRIPTION OF EXEMPLARY EMBODIMENTS

Figure 1:
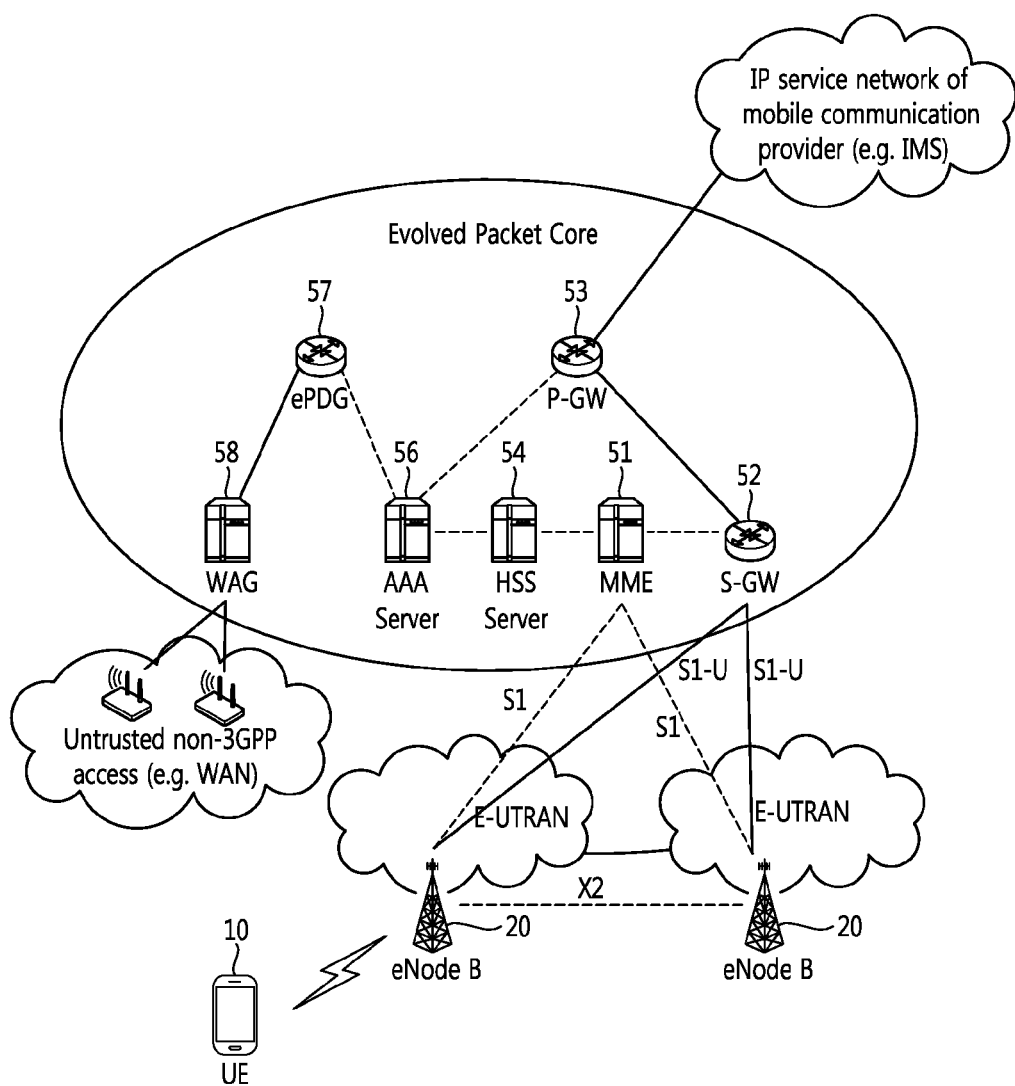
FIG. 1 shows the configuration of an evolved mobile communication network.
Figure 2:
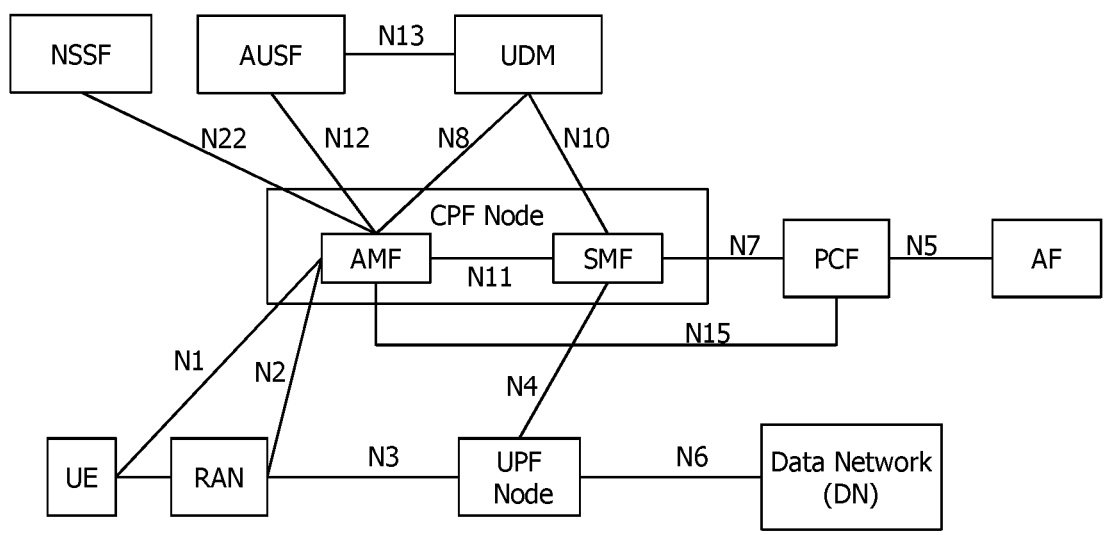
FIG. 2 is an exemplary diagram illustrating a predicted structure of a next generation mobile communication in terms of a node.
Figure 3:
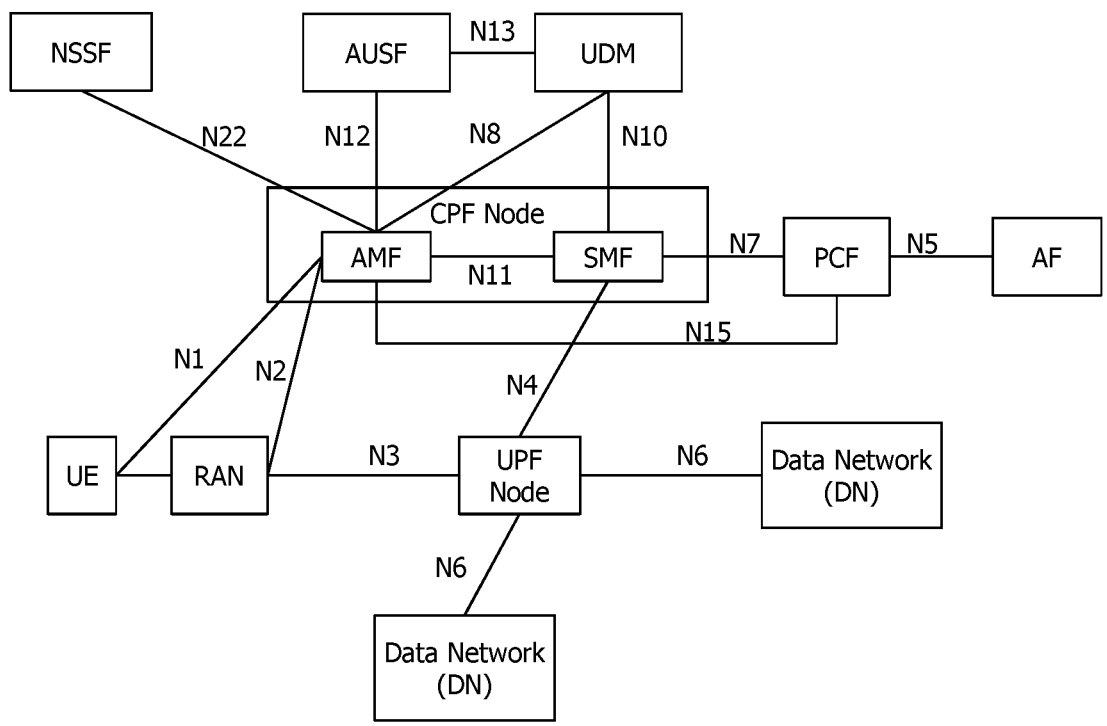
FIG. 3 is an exemplary diagram illustrating an architecture for supporting a concurrent access through two data networks.
Figure 4A:
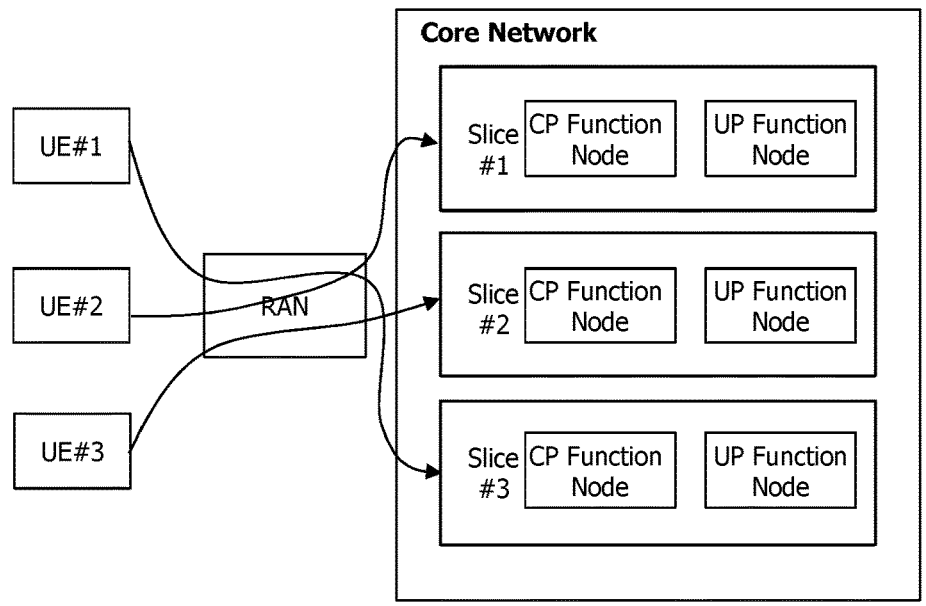
FIG. 4a illustrates an example of architecture for implementing network slicing.
Figure 4B:
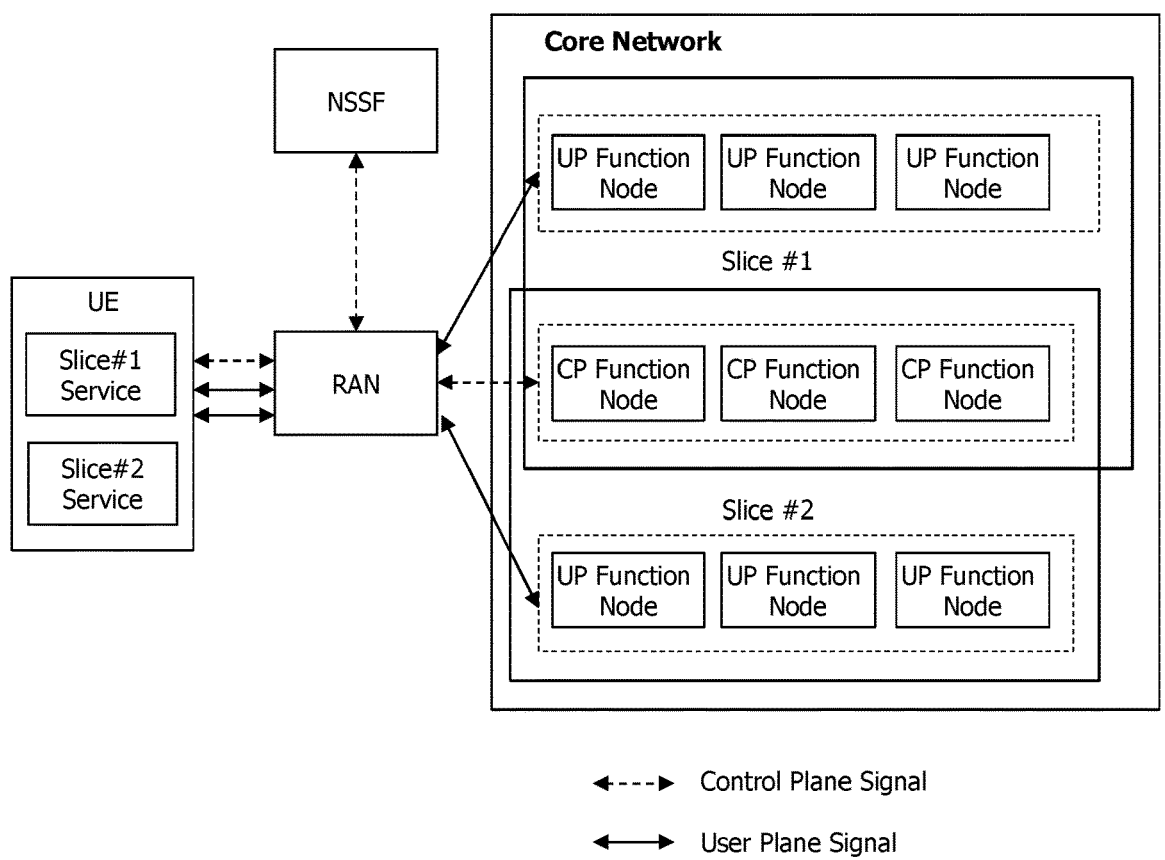
FIG. 4b illustrates another example of architecture for implementing network slicing.
Figure 5A:
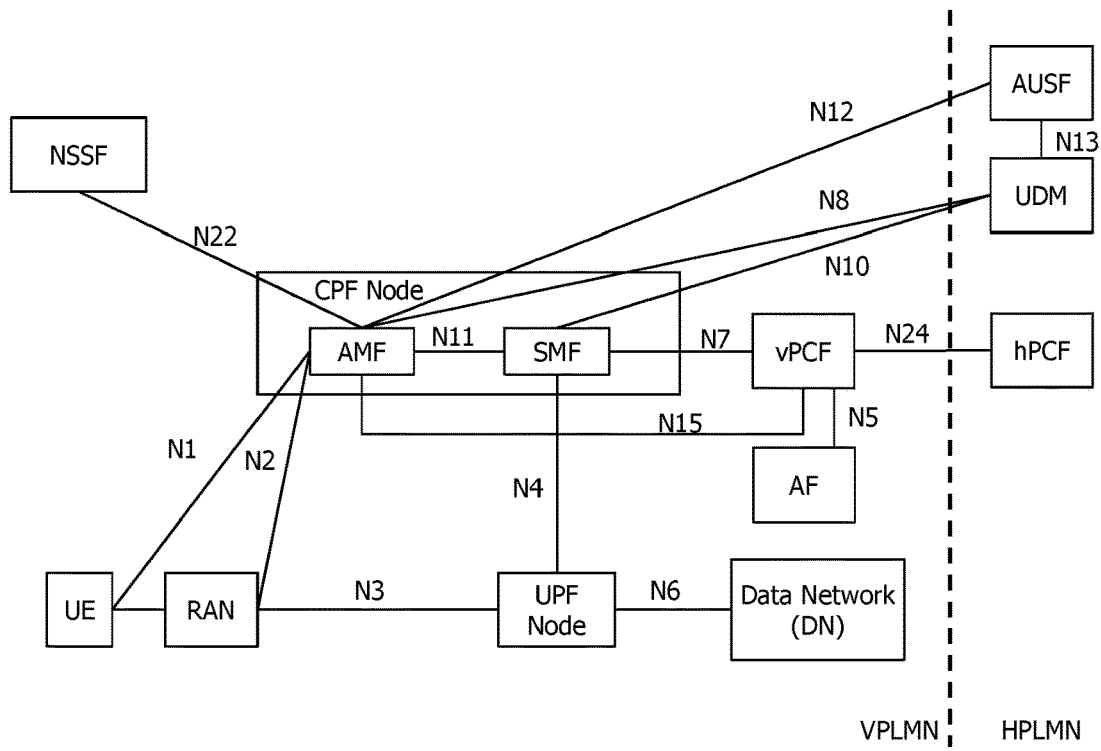
FIG. 5a is an exemplary diagram illustrating an architecture to which a Local Breakout (LBO) scheme is applied during roaming.
Figure 5B:
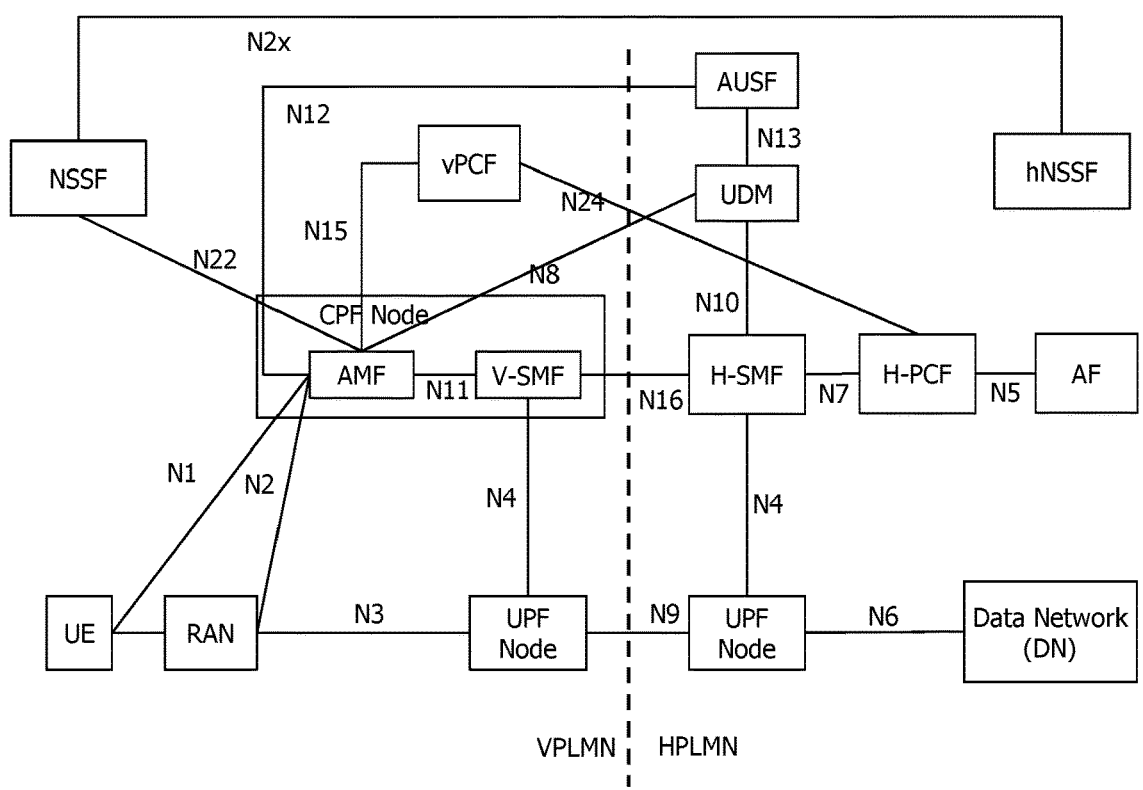
FIG. 5b is an exemplary diagram illustrating an architecture to which a Home Routed (HR) scheme is applied during roaming.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definitions of Terms

To help understanding the present disclosure, the terms used herein are briefly defined before setting out to describe the present disclosure with reference to accompanying drawings.

UE/MS: An abbreviation of User Equipment/Mobile Station. UE 100 refers to a terminal device.

EPS: An abbreviation of Evolved Packet System. EPS refers to a core network supporting a Long Term Evolution (LTE) network and to a network evolved from an UMTS.

Public Data Network (PDN): PDN refers to an independent network in which a service providing server is located.

Packet Data Network Gateway (PDN-GW): PDN-GW refers to a network node of an EPS network, which performs UE IP address allocation, packet screening & filtering, and charging data collection functions.

Serving Gateway (GW): Serving GW refers to a network node of an EPS network, which performs mobility anchor, packet routing, idle mode packet buffering, and triggering MME to page UE functions.

eNodeB: eNodeB is a base station of an Evolved Packet System (EPS) and installed outdoors. The cell coverage of the eNodeB corresponds to a macro cell.

MME: An abbreviation of Mobility Management Entity. MME controls each entity within an EPS in order to provide a session and mobility for a UE.

Session: A session is a passage for data transmission, and a unit thereof may be a PDN, a bearer, or an IP flow unit. As defined in the 3GPP, the units may be classified into an entire target network unit (APN or PDN level), a QoS unit (a bearer unit) within the entire target network, and a destination IP address unit.

APN: An abbreviation of Access Point Name. APN is a name of an access point managed in a network and is provided to a UE. In other words, APN is a character string that denotes or identifies a PDN. A requested service or a network (PDN) is accessed via a P-GW; APN is a name (character string) predefined within a network, by which the corresponding P-GW may be found. For example, APN may have a form such as internet.mnc012.mcc345.gprs.

PDN connection: A PDN connection is a connection from a UE to a PDN, namely, an association (or connection) between a UE indicated by an IP address and a PDN indicated by an APN. A PDN connection refers to a connection between entities within a core network (UE 100-PDN GW), by which a session may be formed.

UE context: UE context is situation information of a UE used for managing the UE in a network, that is, situation information including a UE ID, mobility (for example, current location), and attributes of a session (for example, QoS and priority).

Non-Access-Stratum (NAS): A higher stratum of a control plane between a UE and an MME. NAS supports mobility management, session management, IP address management, and other functions between a UE and a network.

PLMN: An abbreviation of Public Land Mobile Network. PLMN refers to a network identification number of a service provider. In the case of roaming of a UE, PLMN is divided into a home PLMN (HPLMN) and a visited PLMN (VPLMN).

DNN: An abbreviation of Data Network Name. DNN is provided to a UE as a name of an access point managed in a network similarly to how the APN is used. In the 5G system, a DNN is used as an equivalent of the APN.

Network Slice Selection Policy (NSSP): NSSP is used by a UE for mapping between an application and a Session Network Slice Selection Assistance Information (S-NSSAI).

<Interworking with Existing 4th-Generation Mobile Communication System>

Even if a UE gets out of coverage of the next-generation Radio Access Network (RAN), the UE should be able to receive a service through the 4th generation mobile communication system. This mechanism is referred to as interworking. Hereinafter, interworking will be described in detail.

Figure 6A:
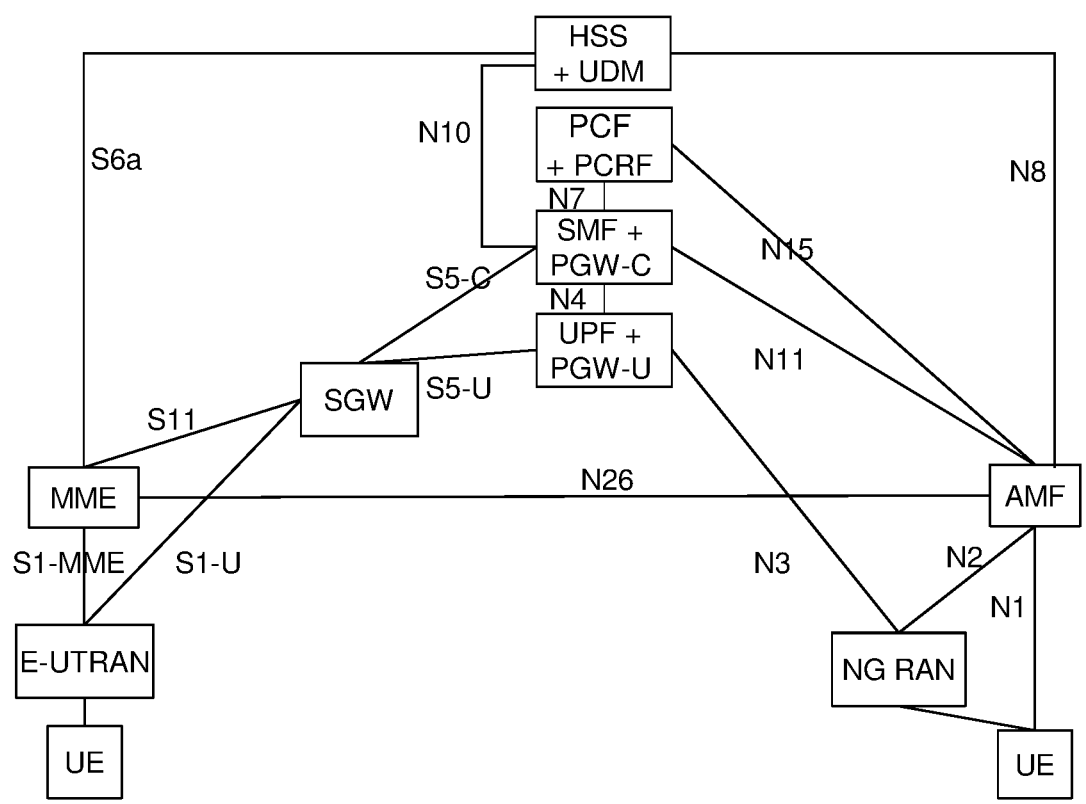
FIG. 6*a* illustrates an architecture for interworking when a UE does not roam.
Figure 6B:
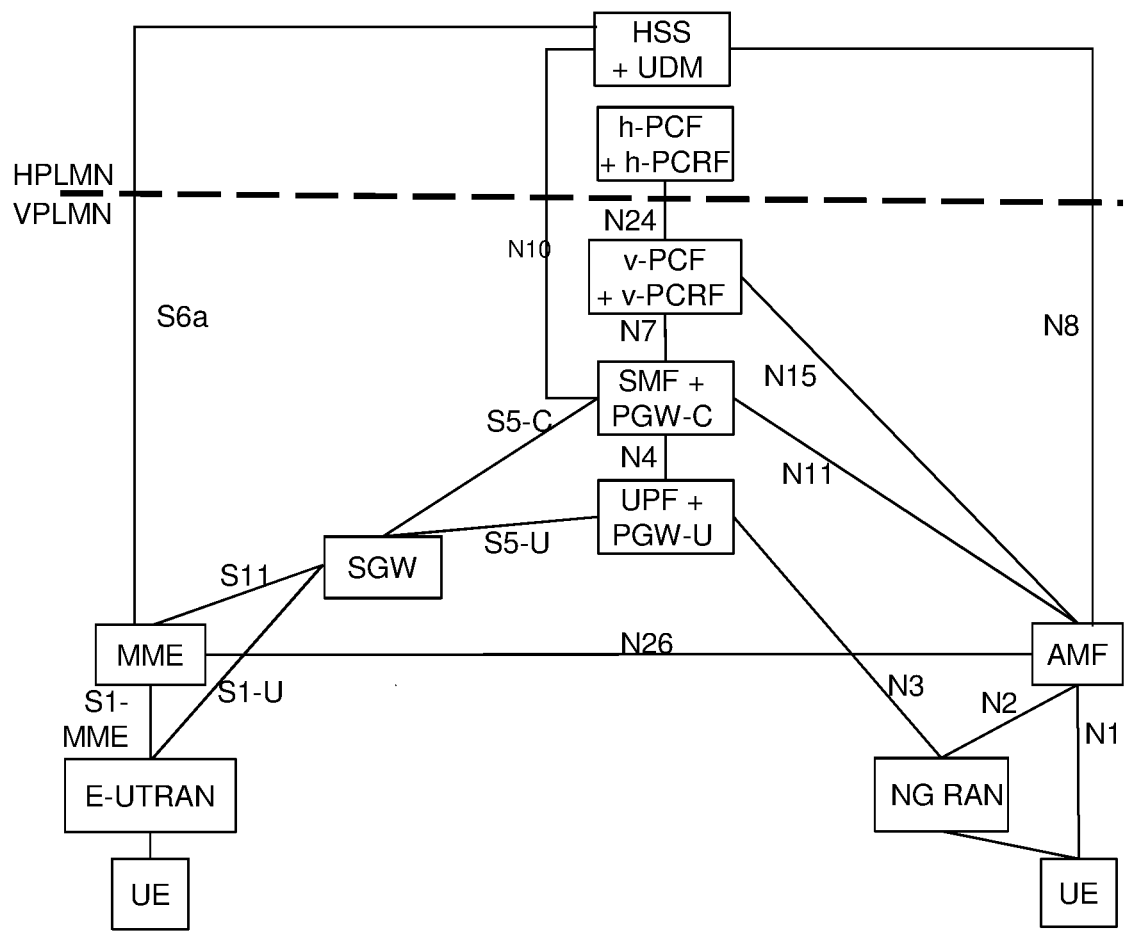
FIG. 6*b* illustrates an architecture for interworking when a UE roams.

FIG. 6a Illustrates an Architecture for Interworking when a UE does not Roam, and FIG. 6b Illustrates an Architecture for Interworking when a UE Roams.

Referring to FIG. 6a, when a UE does not roam, an E-UTRAN and an EPC for the existing 4th generation LTE and the 5th generation mobile communication network may interwork with each other. In FIG. 6a, a Packet data network Gateway (PGW) for an existing EPC is divided into a PGW-U, which is responsible for only a user plane, and a PGW-C, which is responsible for a control plane. The PGW-U is merged into an UPF node of the 5th generation core network, and the PGW-C is merged into an SMF node of the 5th generation core network. A Policy and Charging Rules Function (PCRF) for an existing EPC may be merged into a PCF of the 5th core network. An HSS for the existing EPC may be merged into UDM of the 5th core network. The UE may access the core network through the E-UTRAN but may access the core network though a 5G radio access network (RAN) and an AMF.

Referring to FIGS. 6a and 6b and comparing them with each other, when the UE roams to a Visited Public Land Mobile Network (VPLMN), data of the UE are transmitted via a Home PLMN (HPLMN).

Meanwhile, the N26 interface of FIGS. 6a and 6b is an interface connected between an MME and an AMF to facilitate interworking between an EPC and an NG core. The N26 interface may be selectively supported according to a service provider. In other words, a network service provider may or may not provide the N26 interface for interworking with the EPC.

<Registration Procedure>

The UE needs to be authorized to allow mobility tracking and data reception and to receive a service. To this end, the UE has to register to the network. A registration procedure is performed when the UE needs to perform initial registration to the 5G system. Also, the registration procedure is performed when the UE performs a periodic registration update, when the UE moves to a tracking area (TA) in an idle mode, and when the UE needs to perform a periodic registration update.

During the initial registration procedure, ID of the UE may be obtained from the UE. The AMF may deliver PEI (IMEISV) to the UDM, SMF, and PCF.

Figure 7:
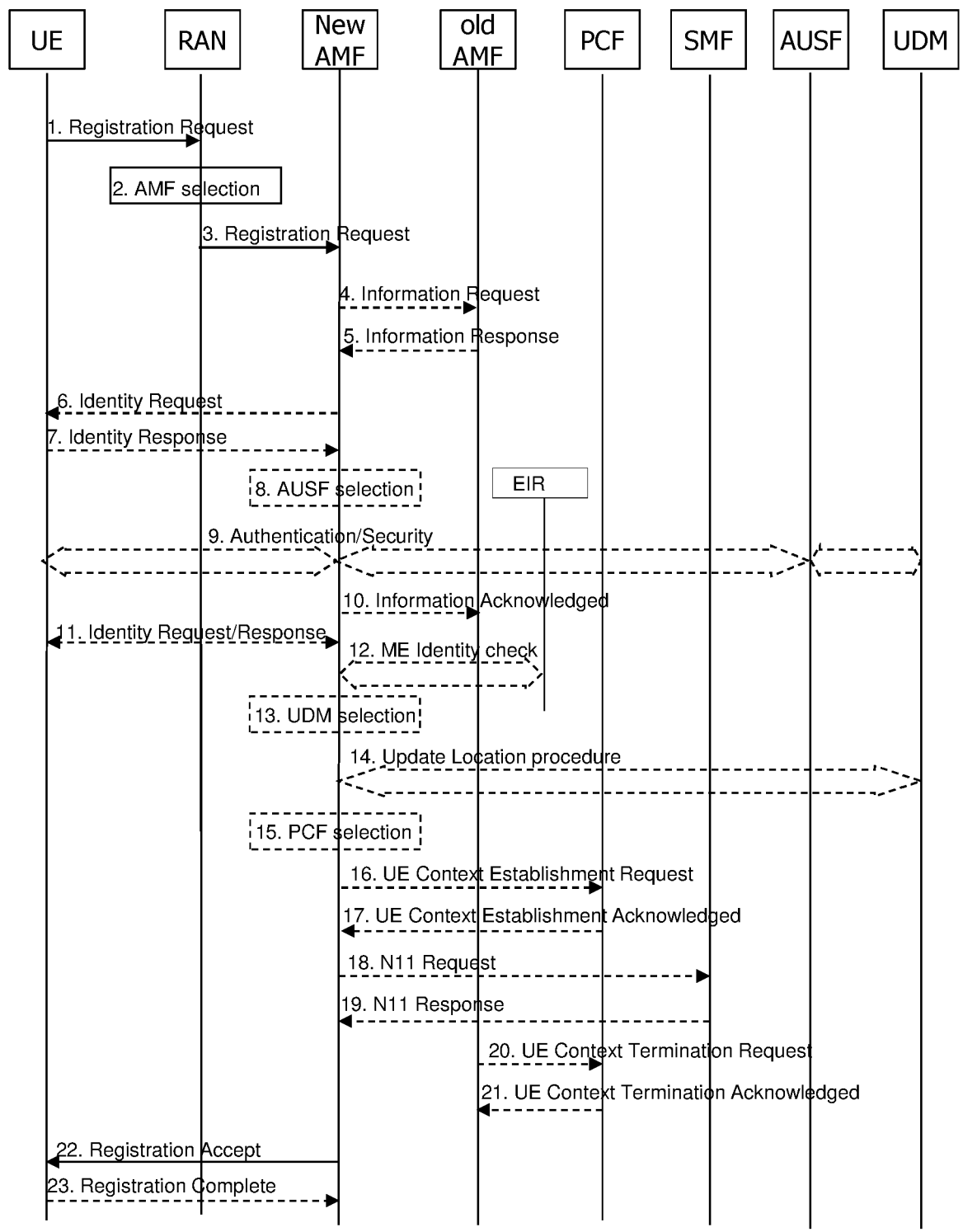
FIG. 7 is a signal flow diagram illustrating an exemplary registration procedure.

FIG. 7 is a Signal Flow Diagram Illustrating an Exemplary Registration Procedure.

1) A UE may transmit an AN message to the RAN. The AN message may include AN parameters and a registration request message. The registration request message may include information on a registration type, a subscriber permanent ID or a temporary user ID, a security parameter, Network Slice Selection Assistance Information (NSSAI), 5G capability of the UE, and Protocol Data Unit (PDU) session state.

In the case of the 5G RAN, the AN parameter may include an SUPI or a temporary user ID, a selected network, and NSSAI.

The registration type may indicate whether the UE is in the "initial registration" (namely, the UE is in a non-registered state), "mobility registration update" (namely, the UE is in a registered state and starts a registration procedure due to its mobility) or "periodic registration update" (namely, the UE is in a registered state and starts the registration procedure due to expiration of a periodic update timer). When the temporary user ID is included, the temporary user ID indicates the last serving AMF. If the UE has already been registered to a PLMN through 3GPP access and to other PLMN through non-3GPP access, the UE may not provide a UE temporary ID assigned by the AMF during the registration procedure through non-3GPP access.

The security parameter may be used for authentication and integrity protection.

The PDU session state represents a (preset) PDU session available for the UE.

2) When an SUPI is included or the temporary user ID does not indicate a valid AMF, the RAN may select the AMF based on the (R)AT and NSSAI.

When the (R)AN is unable to select a suitable AMF, a temporary AMF is selected according to a local policy, and a registration request is delivered to the selected AMF. When the selected AMF is unable to provide a service to the UE, the selected AMF selects another AMF more suitable for the UE.

3) The RAN transmits an N2 message to a new AMF. The N2 message includes an N2 parameter and a registration request. The registration request may include a registration type, a subscriber permanent identifier or a temporary user ID, a security parameter, and NSSAI and an MICO mode basic setting.

When the 5G-RAN is used, the N2 parameter includes location information related to a cell on which the UE camps, a cell identifier, and a RAT type.

If the registration type indicated by the UE is periodic registration update, steps 4 to 17 described below may not be performed.

4) The newly selected AMF may transmit an information request message to a previous AMF.

When the temporary user ID of the UE is included in a registration request message and a serving AMF has been changed since the last registration, the new AMF may transmit an information request message including complete registration request information to the previous AMF in order to request the SUPI and MM context of the UE.

5) The previous AMF transmits an information response message to the newly selected AMF. The information response message may include the SUPI, MM context, and SMF information.

Specifically, the previous AMF transmits an information response message including the SUPI and MM context of the UE.

When the previous AMF has information on an active PDU session, the previous AMF may add SMF information including an ID and a PDU session ID of the SMF to the information response message.

6) When the SUPI is not provided by the UE or not searched from the previous AMF, the new AMF transmits an Identity Request message to the UE.

7) The UE transmits an Identity Response message including the SUPI to the new AMF.

8) The AMF may determine to trigger an AUSF. In this case, the AMF may select an AUSF based on the SUPI.

9) The AUSF may start authentication of the UE and NAS security function.

10) The new AMF may transmit an information response message to the previous AMF.

If the AMF is changed, the new AMF may transmit the information response message to confirm delivery of the MM context of the UE.

If the authentication/security procedure fails, registration is rejected, and the new AMF may transmit a reject message to the previous AMF.

11) The new AMF may transmit an Identity Request message to the UE.

When PEI is not provided by the UE or is not searched from the previous AMF, an Identity Request message may be transmitted so that the new AMF may search for the PEI.

12) The new AMF checks an ME identifier.

13) If step 14 described below is performed, the new AMF selects a UDM based on the SUPI.

14) If the AMF is changed after final registration, the AMF does not have valid subscription context for the UE, or the UE provides an SUPI that does not refer to valid context in the AMF, a new AMF initiates a update location procedure. Or the update location procedure may also be initiated when the UDM starts cancel location for the previous AMF. The previous AMF discards MM context and notifies all available SMF(s) of the discard, and the new AMF generates MM context for the UE after obtaining AMF-related subscription data from the UDM.

When network slicing is used, the AMF obtains NSSAI allowed based on requested NSSAI, UE subscription, and a local policy. When the AMF is not suitable for supporting the allowed NSSAI, the registration request is routed again.

15) The new AMF may select a PCF based on the SUPI.

16) The new AMF transmits a UE Context Establishment Request message to the PCF. The AMF may request an operator policy with respect to the UE from the PCF.

17) The PCF transmits a UE Context Establishment Acknowledged message to the new AMF.

18) The new AMF transmits an N11 request message to the SMF.

Specifically, if the AMF is changed, a new AMF notifies each SMF of the new AMF that provides a service to the UE. The AMF verifies a PDU session state from the UE by using SMF information available. If it is the case that the AMF has been changed, available SMF information may be received from a previous AMF. The new AMF may request the SMF to release network resources related to a PDU session not activated in the UE.

19) The new AMF transmits an N11 response message to the SMF.

20) The previous AMF transmits a UE Context Termination Request message to the PCF.

If the previous AMF has requested before such that the PCF configures the UE context, the previous AMF may delete the UE context from the PCF.

21) The PCF may transmit a UE Context Termination Request message to the previous AMF.

22) The new AMF transmits a registration accept message to the UE. The registration accept message may include a temporary user ID, a registration area, mobility limit, a PDU session state, NSSAI, a periodic registration update timer, and an allowed MICO mode.

The registration accept message may include allowed NSSAI and information of the mapped NSSAI. The allowed NSSAI information on the access type of the UE may be included within an N2 message including the registration accept message. The information of the mapped NSSAI is information for mapping each S-NSSAI of the allowed NSSAI to the S-NASSI of the configured NSSAI for the HPLMN.

When the AMF assigns a new temporary user ID, the temporary user ID may be further included in the registration accept message. When mobility limit is applied to the UE, information indicating the mobility limit may be additionally included within the registration accept message. The AMF may include information indicating the PDU session state of the UE within the registration accept message. From a received PDU session state, the UE may remove temporary internal resources related to a PDU session not indicated as being activated. If the PDU session state information is included in a Registration Request, the AMF may include information indicating the PDU session state to the UE within the registration accept message.

23) The UE transmits a registration complete message to the new AMF.

<PDU Session Establishment Procedure>

Protocol Data Unit (PDU) session establishment procedures may be divided into two types as follows.

PDU session establishment procedure initiated by a UE

PDU session establishment procedure initiated by a network. To this purpose, the network may transmit a device trigger message to an application(s) of the UE.

Figure 8:
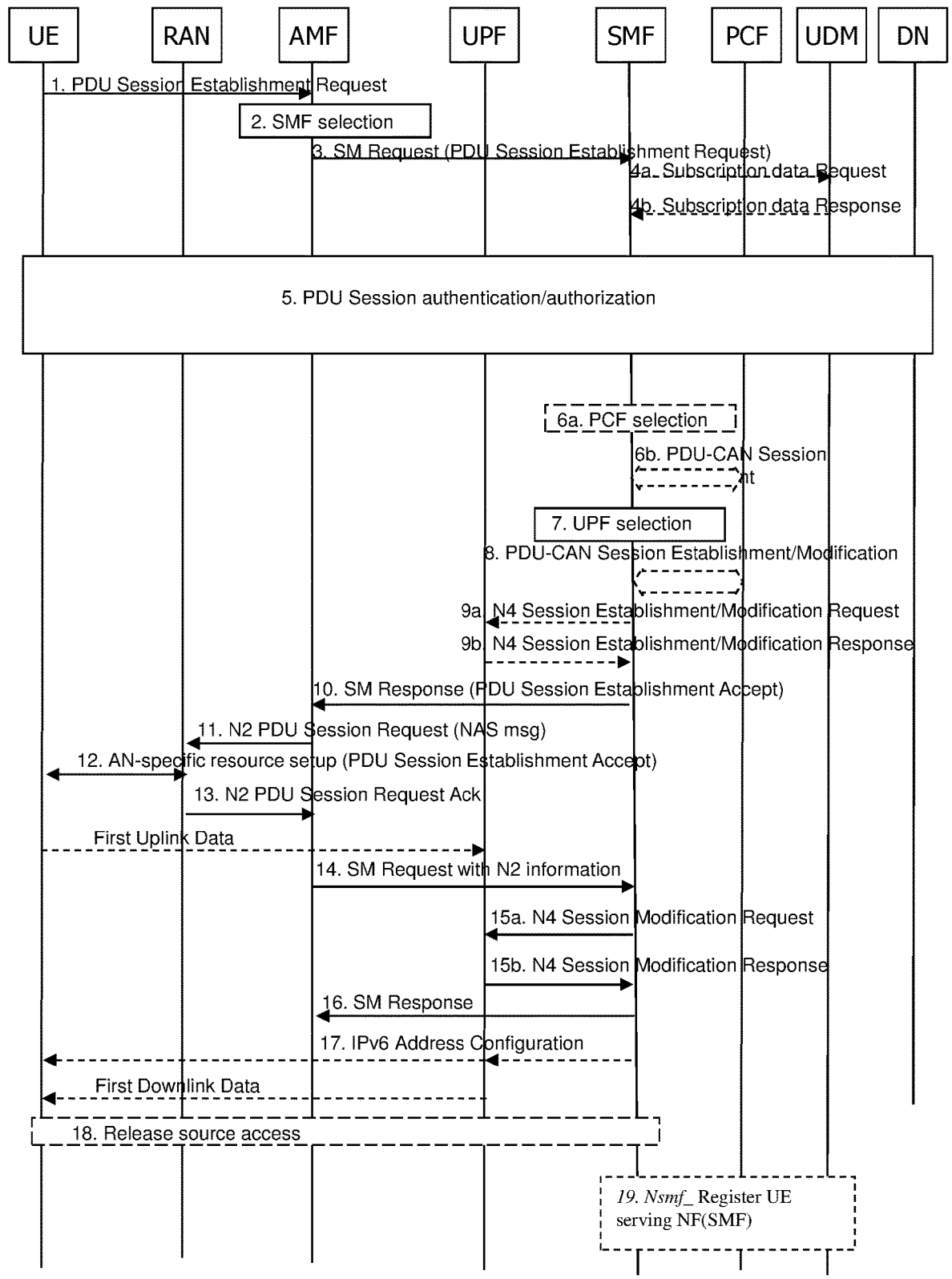
FIG. 8 is a signal flow diagram illustrating an exemplary PDU session establishment procedure.

FIG. 8 is a signal flow diagram illustrating an exemplary PDU session establishment procedure.

The procedure shown in FIG. 8 assumes that a UE has already registered for the AMF according to the registration procedure shown in FIG. 7. Therefore, it is assumed that the AMF has already obtained user subscription data from the UDM.

1) The UE transmits a NAS message to the AMF. The message may include Session Network Slice Selection Assistance Information (S-NSSAI), a DNN, a PDU session ID, a request type, and N1 SM information.

Specifically, the UE includes the S-NSSAI from the allowed NSSAI of the current access type. If the information on the mapped NSSAI is provided to the UE, the UE may provide both the S-NSSAI from the allowed NSSAI and the corresponding S-NSSAI from the information on the mapped NSSAI. Here, the information of the mapped NSSAI is information for mapping each S-NSSAI of the allowed NSSAI to the S-NASSI of the configured NSSAI for the HPLMN.

More specifically, the UE may extract and store information of the allowed S-NSSAI and the information of the mapped S-NSSAI, which are included in a registration accept message received from the network (namely, the AMF) in the registration procedure of FIG. 7. Therefore, the UE may transmit the S-NSSAI based on the allowed NSSAI and the corresponding S-NSSAI based on the information of the mapped NSSAI by including both of them in the PDU session establishment request message.

To establish a new PDU session, the UE may generate a new PDU session ID.

The UE may start a PDU session establishment procedure initiated by the UE by transmitting a NAS message which includes a PDU session establishment request message within N1 SM information. The PDU session establishment request message may include a request type, an SSC mode, and a protocol configuration option.

When the PDU session establishment is intended to configure a new PDU session, the request type indicates "initial request". However, when there is an existing PDU session between 3GPP access and non-3GPP access, the request type may indicate "existing PDU session".

The NAS message transmitted by the UE is encapsulated within an N2 message by the AN. The N2 message is transmitted to the AMF and may include user location information and access technology type information.

The N1 SM information may include an SM PDU DN request container that includes information about PDU session authentication by an external DN.

2) When a message indicates that the request type is "initial request" and when the PDU session ID is not used for an existing PDU session of the UE, the AMF may determine that the message corresponds to a request for a new PDU session.

If the NAS message does not include S-NSSAI, the AMF may determine default S-NSSAI for a PDU session requested according to UE subscription. The AMF may store the PDU session ID and the ID of the SMF in association with each other.

3) The AMF transmits an SM request message to the SMF. The SM request message may include a subscriber permanent ID, a DNN, S-NSSAI, a PDU session ID, an AMF ID, N1 SM information, user location information, and an access technology type. The N1 SM information may include a PDU session ID and a PDU session establishment request message.

The AMF ID is used for identifying an AMF providing a service to the UE. The N1 SM information may include a PDU session establishment request message received from the UE.

4a) The SMF transmits a subscriber data request message to the UDM. The subscriber data request message may include a subscriber permanent ID and a DNN.

If the request type in the step 3 is "existing PDU session", the SMF determines that the corresponding request is caused by handover between 3GPP access and non-3GPP access. The SMF may identify an existing PDU session based on the PDU session ID.

If it is the case that the SMF has not yet searched for SM-related subscription data about the UE related to the DNN, the SMF may request subscription data.

4b) The UDM may transmit a subscription data response message to the SMF.

The subscription data may include information on an authenticated request type, an authenticated SSC mode, and a basic QoS profile.

The SMF may check whether a UE request complies with a user subscription and local policies. Or, the SMF rejects the UE request through NAS SM signaling delivered by the AMF (including a related cause for SM rejection) and informs the AMF that the PDU session ID should be considered to have been released.

5) The SMF transmits a message to the DN through the UPF.

Specifically, when the SMF has to approve/authenticate PDU session establishment, the SMF selects the UPF and triggers a PDU.

When PDU session establishment authentication/authorization fails, the SMF terminates the PDU session establishment procedure and reports rejection to the UE.

6a) If a dynamic PCC rule is distributed, the SMF selects the PCF.

6b) the SMF may start PDU-CAN session establishment toward the PCF to obtain a basic PCC rule for a PDU session. If the request type in the step 3 indicates "existing PDU session", the PCF may start PDU-CAN session modification instead.

7) If the request type in the step 3 indicates "initial request", the SMF selects an SSC mode for the PDU session. If the step 5 is not performed, the SMF may also select the UPF. If the request type is IPv4 or IPv6, the SMF may allocate an IP address/prefix for the PDU session.

8) When a dynamic PCC rule is disposed and PDU-CAN session establishment has not been completed yet, the SMF may start the PDU-CAN session.

9) If the request type indicates "initial request" and the step 5 has not been performed yet, the SMF may start an N4 session establishment procedure by using a selected UPF, otherwise the SMF may start an N4 session modification procedure by using the selected UPF.

9a) The SMF transmits an N4 session establishment/modification request message to the UPF. And the SMF may provide a packet detection, execution, and report rules to be installed in the UPF with respect to the PDU session. When the CN tunnel information is assigned to the SMF, the CN tunnel information may be provided to the UPF.

9b) By transmitting an N4 session establishment/modification response message, the UPF may respond to the request message. When the CN tunnel information is assigned by the UPF, the CN tunnel information may be provided to the SME 10) The SMF transmits an SM response message to the AMF. The message may include a cause, N2 SM information, and N1 SM information. The N2 SM information may include a PDU session ID, a QoS profile, and CN tunnel information. The N1 SM information may include a PDU session establishment accept message. The PDU session establishment accept message may include an allowed QoS rule, an SSC mode, S-NSSAI, and an allocated IPv4 address.

The N2 SM information is the information that the AMF has to deliver to the RAN, which may include the following.

CN tunnel information: This corresponds to a core network address of an N3 tunnel corresponding to a PDU session.

QoS profile: This is used for providing mapping between a QoS parameter and a QoS flow identifier to the RAN.

PDU session ID: This may be used for indicating association between AN resources for a UE and a PDU session through AN signaling with respect to the UE.

Meanwhile, the N1 SM information includes a PDU session accept message that has to be provided to the UE by the AMF.

Multiple QoS rules may be included in the N1 SM information and the N2 SM information of the PDU session establishment accept message.

The SM response message also includes the PDU session ID and information that enables the AMF to determine which access should be used for a UE as well as which target UE should be used.

11) The AMF transmits an N2 PDU session request message to the RAN. The message may include N2 SM information and a NAS message. The NAS message may include a PDU session ID and a PDU session establishment accept message.

The AMF may transmit a NAS message that includes a PDU session ID and a PDU session establishment accept message. Also, the AMF transmits the N2 SM information received from the SMF to the RAN by including the received N2 SM information in the N2 PDU session request message.

12) The RAN may exchange specific signaling with a UE related to the information received from the SMF.

The RAN also assigns RAN N3 tunnel information with respect to a PDU session.

The RAN delivers a NAS message provided in the step 10 to the UE. The NAS message may include a PDU session ID and N1 SM information. The N1 SM information may include a PDU session establishment accept message.

The RAN transmits the NAS message to the UE only when required RAN resources are configured and RAN tunnel information is successfully assigned.

13) The RAN transmits an N2 PDU session response message to the AMF. The N2 PDU session response message may include a PDU session ID, a cause, and N2 SM information. The N2 SM information may include a PDU session ID, (AN) tunnel information, and a list of allowed/ rejected QoS profiles.

The RAN tunnel information may correspond to an access network address of an N3 tunnel corresponding to the PDU session.

14) The AMF may transmit an SM request message to the SMF. The SM request message may include N2 SM information. Here, the AMF may deliver the N2 SM information received from the RAN to the SMF.

15a) If an N4 session for the PDU session has not been already configured, the SMF may start an N4 session establishment procedure in conjunction with the UPF. Otherwise, the SMF may start an N4 session modification procedure by using the UPF. The SMF may provide AN tunnel information and CN tunnel information. The CN tunnel information may have to be provided only when the SMF selects the CN tunnel information in the step 8.

15b) The UPF may transmit an N4 session establishment/ modification response message to the SMF.

16) The SMF may transmit an SM response message to the AMF. If the process is terminated, the AMF may transfer a related event to the SMF. The related event occurs when RAN tunnel information is changed or at the time of handover during which the AMF is redisposed.

17) The SMF transmits information to the UE through the UPF. Specifically, in the case of PDU type IPv6, the SMF may generate an IPv6 Router Advertisement and transmit it to the UE through the N4 and the UPF.

18) When the PDU session establishment request is caused by handover between 3GPP access and non-3GPP access, namely, if the request type is set to "existing PDU session", the SMF releases a user plane through source access (3GPP or non-3GPP access).

19) When the ID of the SMF is not included in the step 4*b* by an UDM of DNN subscription context, the SMF may include the SMF address and the DNN to call a "UDM_ Register UE serving NF service". The UDM may store the ID and the address of the SMF and a related DNN.

If PDU session establishment is not successful during the procedure, the SMF informs the AMF of the failure.

<UE Route Selection Policy (URSP)>

URSP includes information on a policy about how a UE should transmit traffic. Traffic may be routed to an established PDU session, may be offloaded via non-3GPP access outside a PDU session, or may trigger establishment of a new PDU session.

In general, URSP is provided to a UE/updated through a UE Configuration Update procedure by a Policy Control Function (PCF) of a network.

Figure 9:
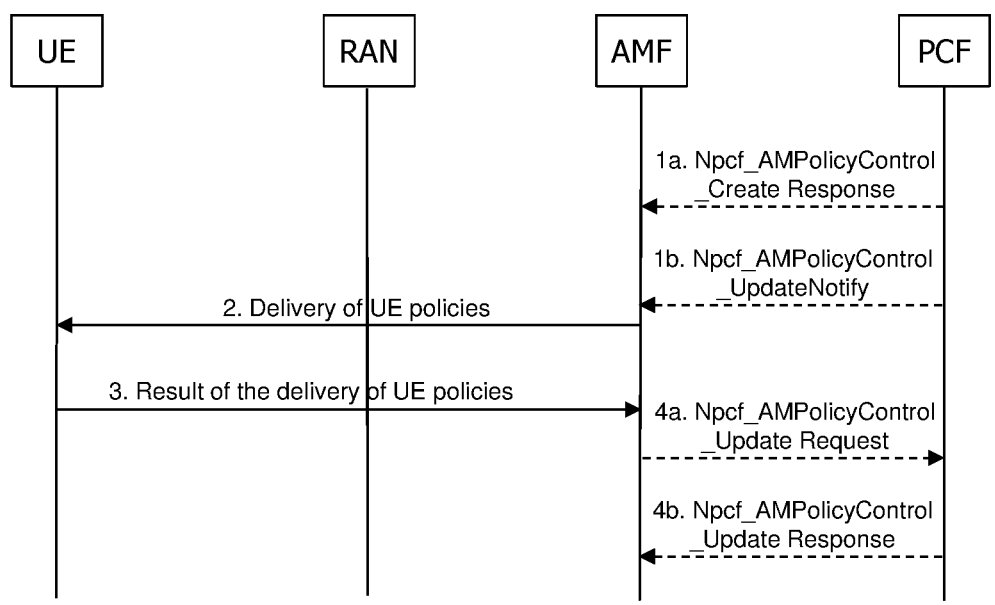
FIG. 9 illustrates a UE configuration update procedure for delivery of UE policy.

FIG. 9 Illustrates a UE Configuration Update Procedure for Delivery of UE Policy.

When a PCF wants to update UE access within a UE configuration and PDU session selection information (namely, a UE policy), the illustrated procedure is initiated.

1a) The AMF may receive an Npcf_AMPolicyControl_ Create Response message from the PCF. The received message may include access and mobility-related information or UE policy information (namely, UE access and PDU session selection-related information).

1b) The AMF receives an Npcf_AMPolicyControl_Create Response message from the PCE The received message may include access and mobility-related information or UE policy information (namely, UE access and PDU session selection-related information).

2) When the UE is in an idle state (for example, CM-IDLE state), the AMF may trigger a service request procedure due to a network. However, when the UE is in a connected state, the AMF may deliver the UE policy information received from the PCF to the UE. The UE policy information may include a list of PSIs to inform the UE that one or a plurality of PSIs have been added, removed or modified.

3) The UE may perform a PSI operation and deliver the result to the AMF. The AMF may forward the received result to the PCF.

4) When the AMF receives UE policy information and the PCF is supposed to receive the UE policy information, the AMF may deliver the UE's response to the PCF through an Npcf_AMPolicyControl_Update that includes information on a policy information request trigger condition.

5) The PCF may inform the AMF of the reception of the Npcf_AMPolicyControl_Update.

<Control Plane Load, Congestion, and Overload Control>

Various measures are supported to guarantee NFs in the 5G system to operate under nominal capacity for providing sufficient services and connectivity to a UE and protect the 5G system under various operating conditions (peak operation time or extreme conditions). The various measures include load (re)balancing, overload control, and NAS level congestion control.

<NAS Level Congestion Control>

Here, NAS level congestion control may be applied in general (namely, for all NAS messages) per DNN, per S-NSSAI, and per DNN and S-NSSAI. NAS level congestion control is achieved by providing a back-off timer to the UE. To prevent a large number of UEs from initiating requests deferred by the back-off timer (almost) at the same time, the 5GC should select a back-off timer value so that the deferred requests are not synchronized to each other.

When the UE receives a back-off timer, the UE should not initiate any NAS signaling with regard to the applied congestion control i) until the back-off timer expires, ii) until the UE receives a mobile terminated request from the network, or iii) until the UE initiates signaling for an emergency service or access with a higher priority.

NAS level control may be applied to AMFs and SMFs but may not be applied to high priority access and emergency services.

Under general overload conditions, the AMF may reject NAS messages received from UEs using an arbitrary 5G Access Network (AN). When a NAS request is rejected, the AMF transmits a Mobility Management (MM) back-off timer to the UE, and if UE context is maintained, the AMF may store the back-off time for each UE. The AMF may immediately reject any subsequent request transmitted from the UE before the stored back-off time expires. While the MM back-off timer is running, the UE should not initiate any NAS request except for a deregistration procedure, high priority access, emergency services, and mobile terminated services. When the deregistration procedure is terminated, the back-off timer continues to be running. When the UE is already in a Connection Management (CM)-CONNECTED state while the MM back-off timer is running, the UE may perform registration for mobility registration update. If the UE receives a paging request or a NAS notification message from the AMF while the MM back-off timer is running, the UE has to stop the MM back-off timer and initiate a service request procedure or a registration procedure for mobility registration update.

The MM back-off timer should not affect change of cell/Radio Access Technology (RAT)/access type and Public Land Mobile Network (PLMN). Cell/RAT and Tracking Area (TA) change do not stop the MM back-off timer. The MM back-off timer should not trigger PLMN reselection. The back-off timer is stopped when a new PLMN rather than an equivalent PLMN is accessed.

The AMF should not reject a registration request message for mobility registration update performed when the UE is already in the CM-CONNECTED state. In the case of mobility under the CM-IDLE state, the registration request message for mobility registration update may be rejected, and the MM back-off timer value may be included in a registration reject message. Here, CM-CONNECTED state refers to a state in which the UE has a NAS signaling connection to the AMF over N1. And the CM-IDLE state refers to a state in which the UE does not have a NAS signaling connection established to the AMF over N1.

If the AMF rejects registration request messages or a service request together with the MM back-off timer, and the MM back-off timer is larger than the sum of the UE's Periodic Registration Update timer and Implicit Deregistration timer, the AMF has to adjust a mobile reachable timer and/or the implicit deregistration timer in order not to implicitly deregister the UE while the MM back-off timer is running <APN Based Session Management Congestion Control>

APN based Session Management (SM) congestion control may be activated by the MME due to, for example, a congestion situation.

The MME may reject an EPS SM (hereinafter, ESM) request from the UE (for example, a PDN connection, a bearer resource allocation or a bearer resource change request) when ESM congestion related to an APN is detected and transmit a reject message including an SM back-off timer. If the UE does not provide an APN, the MME may use an APN used in a PDN GW selection procedure.

By transmitting a NAS deactivation EPS bearer context request message including the SM back-off timer to the UE, the MME may deactivate a PDN connection belonging to a congested APN. When the SM back-off timer is included in the NAS deactivation EPS bearer context request message, cause information indicating "reactivation requested" should not be set.

Memo 1: The UE that does not support the SM back-off timer may rather increase the load of the MME by retrying the session management procedure.

When a request without information indicating low access priority is rejected by the MME, the MME may store the SM back-off time for each UE and APN if congestion control is activated for the APN. The MME may immediately reject any subsequent request from the UE that uses the APN before the stored SM back-off time expires. If the MME stores the SM back-off time for each UE and APN and determines to transmit a session management request message to a UE connected to a congested APN, the MME initializes the SM back-off time before transmitting a session management request message to the UE.

If an EPS session management reject message or a NAS deactivation EPS bearer context request message includes information about the SM back-off timer, the UE has to perform the next task until the timer expires.

When an APN is included in a rejected EPS session management request message or the SM back-off timer is included in the NAS deactivation EPS bearer context request message, the UE does not start a session management procedure for a congested APN. The UE may initiate the session management procedure for another APN.

If an APN is not included in the rejected EPS session management request message, the UE may not initiate a session management request for all PDN types without the APN. The UE may initiate the session management procedure for a specific APN.

The SM back-off timer may not be stopped due to cell/TA/PLMN/RAT change

The UE may initiate a session management procedure for high priority access and emergency services even when the SM back-off timer is running If a network initiation EPS session management request message for a congested APN is received while the SM back-off timer is running, the UE has to stop the SM back-off timer related to the APN and respond to the MME.

When the UE is configured to override low access priority and the SM back-off timer is running due to a reject message received in response to a request with low access priority, a higher layer of the UE may request initiation of a session management procedure that does not have a low access priority.

While the EPS SM back-off timer is running, the UE may initiate a PDN disconnection procedure (for example, transmission of a PDN disconnection request message).

Memo 2: When the PDN is disconnected, the UE may not delete a related SM back-off timer.

The UE has to support a separate SM back-off timer for all APNs that may be activated by the UE.

APN based SM congestion control may be applied to NAS ESM signaling initiated from the UE in the control plane. The SM congestion control does not prohibit transmission and reception of data. Also, the SM congestion control does not prohibit initiating a service request procedure for activating a user plane bearer that uses an APN under ESM congestion control.

<APN Based Mobility Management Congestion Control>

The MME may perform APN based congestion control on a UE that uses a specific APN by rejecting an attach procedure while delivering a Mobility Management (MM) back-off timer.

If congestion control is activated for UEs using a specific APN, the MME may transmit the MM back-off timer to the UEs.

When the MME maintains UE context and when the MME rejects a request not including a low access priority indication, the MME may store a back-off time for each UE. The MME may immediately reject any subsequent request from the UE before the stored back-off time expires.

After rejecting an attach request, the MME may maintain subscriber data for a predetermined time period. This operation enables the MME to reject subsequent requests without HSS signaling when a congestion situation due to UEs using a specific APN persists.

While the MM back-off timer is running, the UE is unable to initiate a NAS request for a mobility management procedure. However, even while the MM back-off timer is running, the UE may initiate a mobility management procedure for high priority access and an emergency service. While the MM back-off timer is running, the UE may perform tracking area update if the UE is already in a connected mode.

While the MM back-off timer is running, the UE, which is configured to override low access priority when the MM back-off timer has started upon reception of a reject message in response to a request with a low priority, may start a mobility management procedure without considering low access priority. A higher layer of the UE may request to activate PDN access without involving low access priority. Also, the UE may have active PDN access that does not have low access priority.

<Data Network Name (DNN) Based Congestion Control>

As one of NAS level congestion control schemes, DNN based congestion control is used.

DNN based congestion control is used for avoiding and handling of NAS signaling congestion associated with a UE using a specific/particular DNN, regardless of Single Network Slice Selection Assistance Information (S-NSSAI). Both of the UE and the 5GC support functions to provide DNN based congestion control.

The SMF may apply DNN based congestion control to the UE by rejecting PDU Session Establishment/Modification Request messages transmitted from the UE together with a back-off timer and the DNN associated with the back-off timer. The SMF may release a PDU session belonging to a congested DNN by sending a PDU Session Release Request message to the UE with the back-off timer. If back-off timer is set in the PDU Session Release Request message, a cause value "reactivation requested" should not be set.

When DNN based congestion control is activated at the AMF, the AMF may provide a NAS Transport Error message carrying an Session Management (SM) message. The NAS Transport Error message may include a back-off timer and a DNN associated with the back-off timer. While the back-off timer for a specific DNN is running, the UE does not send any NAS messages for the specific DNN.

Upon reception of the back-off timer for a DNN, the UE has to perform the following actions until the timer expires.

If a DNN associated with the back-off timer is provided, the UE should not initiate any SM procedure for a congested DNN. The UE may initiate SM procedures for other DNNs. When the UE moves to an EPS, the UE should not initiate any SM procedure for an Access Point Name (APN) corresponding to the DNN.

If a DNN associated with the back-off timer is not provided, the UE does not initiate SM requests which belong to the PDU session type without DNN. The UE may initiate Session Management procedures for a specific DNN.

Cell/TA/PLMN/RAT change, change of a untrusted non-3GPP access network, or change of access type does not stop the back-off timer.

The UE may initiate emergency services and SM procedures for high priority access while the back-off timer is running If the UE receives a network initiated SM request message for a congested DNN while the back-off timer is running, the UE has to stop the SM back-off timer associated with the DNN and respond to the 5GC.

The UE may initiate a PDU session release procedure (namely, a procedure for sending a PDU session release request message) while the back-off timer is running. At this time, the UE does not delete the associated back-off timer when disconnecting a PDU session.

The UE has to support a separate back-off timer for every DNN that the UE may use.

To prevent a large number of UEs from initiating requests deferred by the back-off timer (almost) simultaneously, the 5GC has to select a back-off timer value so that the deferred requests are not synchronized to each other.

The DNN based SM congestion control may be applied to NAS SM signaling initiated from the UE in the control plane. The SM congestion control does not prevent the UE from transmitting and receiving data or initiating a service request procedure for activating a user plane connection to the DNN that is a target of SM congestion control.

<S-NSSAI Based Congestion Control>

S-NSSAI based congestion control is used for avoiding and handling of NAS signaling congestion associated with UEs for specific S-NSSAI.

S-NSSAI based congestion control may be used for the following cases.

If S-NSSAI is determined as congested, the SMF may apply S-NSSAI based congestion control to the UE's SM requests including S-NSSAI and provide S-NSSAI associated with a back-off timer.

When a network detects that one or more S-NSSAI congestion controls are satisfied, the network may perform S-NSSAI based congestion control. The network may store S-NSSAI congestion back-off timer for each UE. And the network may store S-NSSAI and a DNN. When the UE does not provide a DNN for a non-urgent PDN session, the network may select and use one of the DNNs below.

A 5th Generation System (5GS) session management timer for S-NSSAI based congestion control by the UE, namely, a case where T3585 is started per S-NSSAI and per DNN.

A 5GS session management timer for S-NSSAI based congestion control by the UE, namely, a case where T3584 is started per S-NSSAI.

Technical Problem to be Solved According to the Present Disclosure

1. First Problem

When the HR scheme is used for 5GS roaming scenarios and the network (for example, the SMF) is in a congested situation, a UE transmits a PDU session establishment request message to the network by including allowed S-NSSAI and mapped S-NSSAI in the message. At this time, when a Visited SMF (V-SMF) of a visited network or a Home SMF (H-SMF) of a home network attempts to perform S-NSSAI only based congestion control in a congested situation, the V-SMF or the H-SMF rejects a PDU session establishment request message requested by the UE, where the V-SMF or the H-SMF responds to the UE with a PDU session establishment reject message by including an (SM) back-off timer for the PDU session and a cause value (for example, a value indicating insufficient resources, namely, #26) in the message. At this time, the UE is unable to determine whether the (SM) back-off timer and the cause value of the reject message originates from the V-SMF or the H-SMF. Therefore, it is not clear whether the (SM) back-off timer included in the reject message should be applied to the allowed S-NSSAI or to the mapped S-NSSAI. Therefore, since the UE inappropriately applies the (SM) back-off timer to the allowed S-NSSAI or to the mapped S-NSSAI, unnecessary NAS signaling requests may be sent to the network, and accordingly, the network is made to perform inefficient NAS level congestion control (namely, SM congestion control).

I-1. Slices of V-PLMN:Slices of H-PLMN=M:N Mapping Scenario

Meanwhile, V-PLMN may use S-NSSAI #A, S-NSSAI #B, . . . , S-NSSAI #M (M slices), and H-PLMN may use S-NSSAI #1, S-NSSAI #2, S-NSSAI #3, . . . , S-NSSAI #N (N slices). In other words, S-NSSAI #A, S-NSSAI #B, . . . , S-NSSAI #M of V-PLMN and S-NSSAI #1, S-NSSAI #2, . . . , S-NSSAI #N of H-PLMN may have an M:N mapping relationship. (In other words, slices of V-PLMN:slices of H-PLMN=M:N.) In general, although one V-PLMN slice may have a mapping relationship with many H-PLMN slices in the current 3GPP, the inverse relationship is not supported. In other words, one H-PLMN slice may not have a mapping relationship with many V-PLMN slices. Here, the mapping relationship refers to the S-NSSAI information used in the H-PLMN being mapped in accordance with the S-NSSAI used in the V-PLMN when the S-NSSAI information supported in the V-PLMN and used by the UE moves to the H-PLMN in a roaming situation.

For example, the M:N mapping relationship is described in the table below.

TABLE 2

| S-NSSAI in the V-PLMN | S-NSSAI in the H-PLMN |
| --- | --- |
| S-NSSAI#A | S-NSSAI#1 |
| S-NSSAI#A | S-NSSAI#2 |
| S-NSSAI#B | S-NSSAI#3 |
| S-NSSAI#B | S-NSSAI#4 |
| S-NSSAI#B | S-NSSAI#5 |
| S-NSSAI#C | S-NSSAI#6 |
| S-NSSAI#C | S-NSSAI#7 |

For example, suppose S-NSSAI based congestion control is carried out while H-SMF #1 is in a normal situation and V-SMF #A is in a congested situation. When the V-SMF attempts to reject a PDU session establishment request message (including allowed S-NSSAI #A and mapped S-NSSAI #1) requested by the UE, the V-SMF responds to the UE with a PDU session establishment reject message by including an (SM) back-off timer for the PDU session and a cause value (for example, a value indicating insufficient resources, namely, #26) in the message. If the UE applies the provided SM back-off timer to the mapped S-NSSAI #1 information instead of the allowed S-NSSAI #A, the UE becomes able to transmit the PDU session establishment request message by including the allowed S-NSSAI #A and the mapped S-NSSAI #2 information in the message, where, in this case, if the PDU session establishment request transmitted by the UE is related to local traffic (namely, local breakout traffic), the V-SMF #A receives a NAS signaling request of the UE in an insufficient manner and rejects the request again. On the other hand, if the PDU session establishment request transmitted by the UE is related to traffic for the HR scheme, the H-SMF #2 in a normal situation may normally process the PDU session establishment request message transmitted by the UE and respond to the UE by using a PDU session establishment accept message.

As another example, suppose S-NSSAI based congestion control is carried out while V-SMF #B is in a normal situation and H-SMF #3 is in a congested situation. When the H-SMF #3 attempts to reject a PDU session establishment request message (including allowed S-NSSAI #B and mapped S-NSSAI #3) requested by the UE, the H-SMF #3 responds to the UE with a PDU session establishment reject message by including an (SM) back-off timer for the corresponding PDU session and a cause value (for example, a value indicating insufficient resources, namely, #26) in the message. If the UE applies the provided SM back-off timer to the allowed S-NSSAI #B instead of the mapped S-NSSAI #3 information, the UE becomes unable to transmit the PDU session establishment request message by including the allowed S-NSSAI #B and the mapped S-NSSAI #5 information in the message (until the SM back-off timer related to S-NSSAI #B expires).

1-2. Slices of V-PLMN:Slices of H-PLMN=1:1 Mapping Scenario

Meanwhile, V-PLMN may use S-NSSAI #A, S-NSSAI #B, . . . , S-NSSAI #X (X slices), and H-PLMN may use S-NSSAI #1, S-NSSAI #2, S-NSSAI #3, . . . , S-NSSAI #X (X slices). At this time, slices of V-PLMN and slices of H-PLMN may have a 1:1 mapping relationship. (For example, slices of V-PLMN:slices of H-PLMN=1:1.) In other words, one H-PLMN slice and one V-PLMN slice are used to have a 1:1 mapping relationship with each other. Here, the mapping relationship refers to the S-NSSAI information used in the H-PLMN being mapped in accordance with the S-NSSAI used in the V-PLMN when the S-NSSAI information supported in the V-PLMN and used by the UE moves to the H-PLMN in a roaming situation.

For example, the 1:1 mapping relationship is described in the table below.

TABLE 3

| S-NSSAI in the V-PLMN | S-NSSAI in the H-PLMN |
| --- | --- |
| S-NSSAI#A | S-NSSAI#1 |
| S-NSSAI#B | S-NSSAI#2 |
| S-NSSAI#C | S-NSSAI#3 |
| S-NSSAI#D | S-NSSAI#4 |
| S-NSSAI#E | S-NSSAI#5 |

For example, when S-NSSAI #A (one slice) for an Internet service by V-SMF #A, S-NSSAI #B for a vehicle to everything (V2X) service by H-SMF #B, and S-NSSAI #C for a Mission Critical Service (MCS) by H-SMF #C are used in the V-PLMN; and S-NSSAI #1 for an Internet service by H-SMF #1, S-NSSAI #2 for a V2X service by H-SMF #2, and S-NSSAI #3 for MCS by H-SMF #3 are used in the H-PLMN, the UE receives and stores allowed S-NSSAI #A, allowed S-NSSAI #B, and allowed S-NSSAI #C and mapped S-NSSAI #1, mapped S-NSSAI #2, and mapped S-NSSAI #3 information while performing a registration procedure according to the HR scheme in a 5GS roaming scenario. Afterwards, when the network (for example, SMF) is in a congested situation according to the HR scheme in the 5GS roaming scenario, the UE transmits a PDU session establishment request message to the network by including allowed S-NSSAI #A and mapped S-NSSAI #1 information in the message. At this time, suppose S-NSSAI based congestion control is carried out while V-SMF #B, V-SMF #C and H-SMF #1, H-SMF #2, and H-SMF #3 are in a normal situation and V-SMF #A is in a congested situation. When V-SMF #A rejects a PDU session establishment request message requested by the UE, the V-SMF #A responds to the UE with a PDU session establishment reject message by including an (SM) back-off timer for the corresponding PDU session and a cause value (for example, a value indicating insufficient resources, namely, #26) in the message. If the UE applies the provided SM back-off timer to the mapped S-NSSAI #1 information instead of the allowed S-NSSAI #A, the UE becomes unable to transmit the PDU session establishment request message by including the allowed S-NSSAI #A and the mapped S-NSSAI #1 information in the message (until the SM back-off timer related to S-NSSAI #1 expires) but the UE becomes able to transmit the PDU session establishment request message by including allowed S-NSSAI #B and mapped S-NSSAI #2 information in the message. In this case, V-SMF #2 or H-SMF #2 in a normal situation may normally process the PDU session establishment request message transmitted by the UE and respond to the UE by using a PDU session establishment accept message.

As another example, suppose S-NSSAI only based congestion control is carried out while V-SMF #A, V-SMF #B, V-SMF #C, H-SMF #2, and H-SMF #3 are in a normal situation and H-SMF #1 is in a congested situation. When H-SMF #1 rejects a PDU session establishment request message requested by the UE, the H-SMF #1 responds to the UE with a PDU session establishment reject message by including an (SM) back-off timer for the corresponding PDU session and a cause value (for example, a value indicating insufficient resources, namely, #26) in the message. If the UE applies the provided SM back-off timer to the allowed S-NSSAI #A instead of the mapped S-NSSAI #1 information, the UE becomes unable to transmit the PDU session establishment request message by including the allowed S-NSSAI #A and the mapped S-NSSAI #1 information in the message (until the SM back-off timer related to S-NSSAI #A expires) but the UE becomes able to transmit the PDU session establishment request message by including allowed S-NSSAI #B and mapped S-NSSAI #2 information in the message. In this case, V-SMF #2 or H-SMF #2 in a normal situation may normally process the PDU session establishment request message transmitted by the UE and respond to the UE by using a PDU session establishment accept message.

I-3. Slices of V-PLMN:Slices of H-PLMN=1:N Mapping Scenario

Meanwhile, V-PLMN may use one S-NSSAI #A (one slice), and H-PLMN may use S-NSSAI #1, S-NSSAI #2, S-NSSAI #3, . . . , S-NSSAI #N (N slices). In other words, S-NSSAI #A of V-PLMN and S-NSSAI #1, . . . , S-NSSAI #N of H-PLMN may have a 1:N mapping relationship. (In other words, slices of V-PLMN:slices of H-PLMN=1:N.) In general, although one V-PLMN slice may have a mapping relationship with many H-PLMN slices in the current 3GPP, the inverse relationship is not supported. In other words, one H-PLMN slice may not have a mapping relationship with many V-PLMN slices. Here, the mapping relationship refers to the S-NSSAI information used in the H-PLMN being mapped in accordance with the S-NSSAI used in the V-PLMN when the S-NSSAI information supported in the V-PLMN and used by the UE moves to the H-PLMN in a roaming situation.

For example, the 1:N mapping relationship is described in the table below.

TABLE 4

| S-NSSAI in the V-PLMN | S-NSSAI in the H-PLMN |
|---|---|
| S-NSSAI#A | S-NSSAI#1 |
| S-NSSAI#A | S-NSSAI#2 |
| S-NSSAI#A | S-NSSAI#3 |
| S-NSSAI#A | S-NSSAI#4 |
| S-NSSAI#A | S-NSSAI#5 |

For example, when only S-NSSAI #A (one slice) for an Internet service by V-SMF #A is used in the V-PLMN; and S-NSSAI #1 for an Internet service by H-SMF #1, S-NSSAI #2 for a V2X service by H-SMF #2, and S-NSSAI #3 for MCS by H-SMF #3 are used in the H-PLMN, the UE receives and stores allowed S-NSSAI #A and mapped S-NSSAI #1, mapped S-NSSAI #2, and mapped S-NSSAI #3 information while performing a registration procedure according to the HR scheme in a 5GS roaming scenario. Afterwards, when the network (for example, SMF) is in a congested situation according to the HR scheme in the 5GS roaming scenario, the UE transmits a PDU session establishment request message to the network by including allowed S-NSSAI #A and mapped S-NSSAI #1 information in the message. At this time, suppose S-NSSAI only based congestion control is carried out while H-SMF #1, H-SMF #2, and H-SMF #3 are in a normal situation and V-SMF #A is in a congested situation. When V-SMF #A rejects a PDU session establishment request message requested by the UE, the V-SMF #A responds to the UE with a PDU session establishment reject message by including an (SM) back-off timer for the corresponding PDU session and a cause value (for example, a value indicating insufficient resources, namely, #26) in the message. If the UE applies the provided SM back-off timer to the mapped S-NSSAI #1 information instead of the allowed S-NSSAI #A, the UE becomes able to transmit the PDU session establishment request message by including the allowed S-NSSAI #A and the mapped S-NSSAI #2 information in the message. In this case, if the PDU session establishment request transmitted by the UE is related to local traffic (namely, local breakout traffic), the V-SMF #A receives a NAS signaling request of the UE in an insufficient manner and rejects the request again. On the other hand, if the PDU session establishment request transmitted by the UE is related to traffic for the HR scheme, the H-SMF #2 in a normal situation may normally process the PDU session establishment request message transmitted by the UE and respond to the UE by using a PDU session establishment accept message.

As another example, suppose S-NSSAI only based congestion control is carried out while V-SMF #A, H-SMF #2, and H-SMF #3 are in a normal situation and H-SMF #1 is in a congested situation. When H-SMF #1 rejects a PDU session establishment request message requested by the UE, the H-SMF #1 responds to the UE with a PDU session establishment reject message by including an (SM) back-off timer for the corresponding PDU session and a cause value (for example, a value indicating insufficient resources, namely, #26) in the message. If the UE applies the provided SM back-off timer to the allowed S-NSSAI #A instead of the mapped S-NSSAI #1 information, the UE becomes unable to transmit the PDU session establishment request message by including the allowed S-NSSAI #A and the mapped S-NSSAI #2 information in the message (until the SM back-off timer related to S-NSSAI #A expires).

All of the scenarios above may be applied even when the UE transmits a PDU session modification request to the network. However, when the UE transmits a PDU session modification request message, the message does not include allowed S-NSSAI information and mapped S-NSSAI information; but since the PDU session modification procedure is a modification procedure for a PDU session established previously, the information about the corresponding PDU session configured previously is already known to the UE, and therefore, the UE is aware of the allowed S-NSSAI information and the mapped S-NSSAI information of the corresponding PDU session configured previously. Afterwards, the network operation that rejects a PDU session modification request message requested by the UE and the subsequent NAS level congestion control operation are the same as described above.

Also, all of the scenarios described above are applied to both of the case using S-NSSAI only based congestion control and the case using specific DNN and S-NSSAI based congestion control together.

2. Second Problem

When the HR scheme is used for 5GS roaming scenarios and the network (for example, the SMF) is in a congested situation, a UE transmits a PDU session establishment request message to the network by including allowed S-NSSAI and mapped S-NSSAI in the message. At this time, when a V-SMF or an H-SMF performs S-NSSAI only based congestion control in a congested situation while the UE transmits a NAS signaling request to the V-SMF via 3-GPP access and transmits a NAS signaling request to the SMF via non-3GPP access (H-N3IWF), the V-SMF or the H-SMF rejects a PDU session establishment request message requested by the UE by responding to the UE with a PDU session establishment reject message by including an (SM) back-off timer for the corresponding PDU session and a cause value (for example, a value indicating insufficient resources, namely, #26) in the message. At this time, the UE is unable to determine whether the (SM) back-off timer and the cause value of the reject message originates from the V-SMF or the H-SMF. Therefore, it is not clear whether the (SM) back-off timer included in the reject message should be applied to the allowed S-NSSAI or to the mapped S-NSSAI. Therefore, since the UE inappropriately applies the (SM) back-off timer to the allowed S-NSSAI or to the mapped S-NSSAI, unnecessary NAS signaling requests may be sent to the network, and accordingly, the network is made to perform inefficient NAS level congestion control (namely, SM congestion control).

For example, suppose S-NSSAI only based congestion control is carried out while H-SMF is in a normal situation and V-SMF is in a congested situation. When the V-SMF attempts to reject a PDU session establishment request message requested by the UE, the V-SMF responds to the UE with a PDU session establishment reject message by including an (SM) back-off timer for the corresponding PDU session and a cause value (for example, a value indicating insufficient resources, namely, #26) in the message. If the UE applies the provided SM back-off timer to the mapped S-NSSAI #1 information instead of the allowed S-NSSAI #A, the UE becomes able to transmit the PDU session establishment request message by including the allowed S-NSSAI #A and the mapped S-NSSAI #2 information in the message, where, in this case, the V-SMF receives a NAS signaling request of the UE in an insufficient manner and rejects the request again.

As another example, suppose S-NSSAI only based congestion control is carried out while V-SMF is in a normal situation and H-SMF is in a congested situation. When the H-SMF attempts to reject a PDU session establishment request message requested by the UE, the H-SMF responds to the UE with a PDU session establishment reject message by including an (SM) back-off timer for the corresponding PDU session and a cause value (for example, a value indicating insufficient resources, namely, #26) in the message. If the UE applies the provided SM back-off timer to the allowed S-NSSAI #B instead of the mapped S-NSSAI #3 information, the UE becomes able to transmit the PDU session establishment request message by including the allowed S-NSSAI #B and the mapped S-NSSAI #5 information in the message, where, in this case, the H-SMF receives a NAS signaling request of the UE in an insufficient manner and rejects the request again.

All of the scenarios above may be applied even when the UE transmits a PDU session modification request to the network. However, when the UE transmits a PDU session modification request message, the message does not include allowed S-NSSAI information and mapped S-NSSAI information; but since the PDU session modification procedure is a modification procedure for a PDU session established previously, the information about the corresponding PDU session configured previously is already known to the UE, and therefore, the UE is aware of the allowed S-NSSAI information and the mapped S-NSSAI information of the corresponding PDU session configured previously. Afterwards, the network operation that rejects a PDU session modification request message requested by the UE and the subsequent NAS level congestion control operation are the same as described above.

All of the scenarios described above are applied to both of the case using S-NSSAI only based congestion control and the case using specific DNN and S-NSSAI based congestion control together. Also, all of the scenarios described above may be applied to the case where the UE transmits a NAS signaling request to the V-SMF via non-3GPP access (via V-N3IWF) and the case where the UE transmits a NAS signaling request to the SMF via 3GPP access.

Disclosures of the Present Disclosure

Therefore, the present disclosure proposes methods for solving the problems described above.

The present disclosure proposes an efficient NAS level congestion control method to be used when a network is in a congested situation in a roaming scenario architecture supporting network slicing of the 5G system (5G mobile communication system or next-generation mobile communication system). The proposed efficient NAS level congestion control method is composed of one or more of the following operations/configuration/steps.

I. First Disclosure: Associated S-NSSAI Information and Back-Off Timer from Network FIG. 10 Illustrates a Method According to a First Disclosure.

Figure 10:
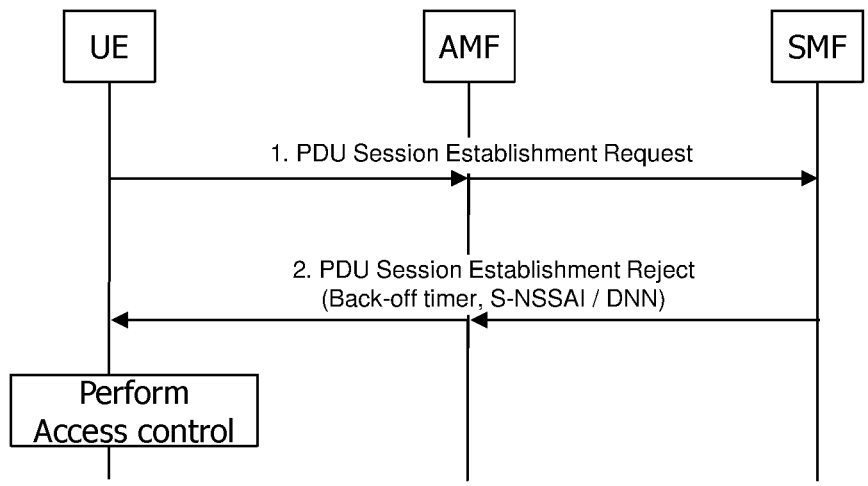
FIG. 10 illustrates a method according to a first disclosure.

In the case of S-NSSAI based congestion control, as shown in FIG. 10, when a network node (for example, H-SMF or V-SMF) rejects a PDU session establishment/modification request of a UE, the network node provides an (SM) back-off timer and (associated) S-NSSAI together. At this time, a reject cause value included together may be a cause value indicating insufficient resources (for example, #26) or a new cause value indicating insufficient resources from the H-SMF or SMF #1 or SMF #2.

Also, in the case of specific DNN and S-NSSAI based congestion control, when a network node (for example, H-SMF or V-SMF) rejects a PDU session establishment/modification request of the UE, the network node provides an (SM) back-off timer, (associated) S-NSSAI, and DNN together. At this time, a reject cause value included together may be a cause value indicating insufficient resources (for example, #26) or a new cause value indicating insufficient resources from the H-SMF or SMF #1 or SMF #2.

The UE performs S-NSSAI based congestion control or specific DNN and S-NSSAI based congestion control based on the provided (SM) back-off timer and (associated) S-NSSAI and/or DNN. In other words, the UE does not make the same PDU session establishment/modification request of associated S-NSSAI and/or DNN until the (SM) back-off timer expires based on the provided, associated S-NSSAI and/or DNN.

II. Second Disclosure: HPLMN or VPLMN Indication/Information from Network

Figure 11:
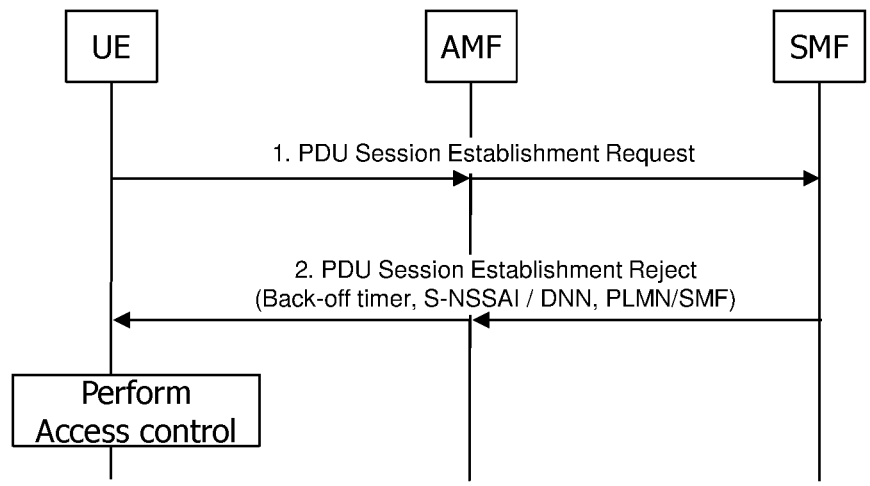
FIG. 11 illustrates a method according to a second disclosure.

FIG. 11 Illustrates a Method According to a Second Disclosure.

In the case of S-NSSAI based congestion control, as shown in FIG. 11, when a network node (for example, H-SMF or V-SMF) rejects a PDU session establishment/modification request of a UE, the network node provides an (SM) back-off timer and HPLMN or VPLMN information or H-SMF or V-SMF indication/information or SMF #1 indication/information (associated with S-NSSAI #1) or SMF #2 indication/information (associated with S-NSSAI #2) together (separately). At this time, a reject cause value included together may be a cause value indicating insufficient resources (for example, #26) or a new cause value indicating insufficient resources from the H-SMF or V-SMF or SMF #1 or SMF #2.

Also, in the case of specific DNN and S-NSSAI based congestion control, when a network node (for example, H-SMF or V-SMF) rejects a PDU session establishment/modification request of the UE, the network node provides an (SM) back-off timer and HPLMN or VPLMN information or H-SMF or V-SMF indication/information or SMF #1 indication/information (associated with S-NSSAI #1) or SMF #2 indication/information (associated with S-NSSAI #2) together (separately). At this time, a reject cause value included together may be a cause value indicating insufficient resources (for example, #26) or a new cause value indicating insufficient resources from the H-SMF or V-SMF or SMF #1 or SMF #2.

Based on the provided HPLMN or VPLMN information or H-SMF or V-SMF indication/information or SMF #1 indication/information (associated with S-NSSAI #2) or SMF #2 indication/information (associated with S-NSSAI #2), the UE performs S-NSSAI based congestion control or specific DNN and S-NSSAI based congestion control. In other words, based on the provided H-SMF or V-SMF indication/information or SMF #1 indication/information (associated with S-NSSAI #1) or SMF #2 indication/information (associated with S-NSSAI #2), the UE does not make the same PDU session establishment/modification request of the associated S-NSSAI and/or DNN until the (SM) back-off timer expires based on the corresponding, associated S-NSSAI and/or DNN.

In other words, the UE does not make the same PDU session establishment/modification request of the associated S-NSSAI and/or DNN until the (SM) back-off timer expires based on the S-NSSAI and/or DAA mapped in relation to the (SM) back-off timer provided based on the HPLMN information or H-SMF indication/information. Also, the UE does not make the same PDU session establishment/modification request of the associated S-NSSAI and/or DNN until the (SM) back-off timer provided based on the VPLMN information or V-SMF indication/information expires based on the associated, allowed S-NSSAI and/or DNN.

III. Third Disclosure: Based on URSP Configuration or Information Preconfigured within UE FIG. 12 Illustrates a Method According to a Third Disclosure.

Figure 12:
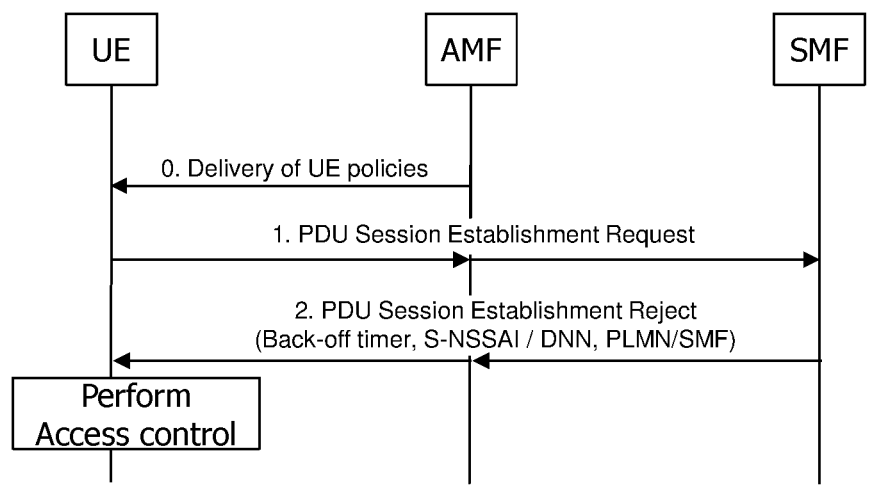
FIG. 12 illustrates a method according to a third disclosure.

As shown in FIG. 12, a UE may receive URSP configuration information in advance from the network through a UE configuration update procedure. When S-NSSAI based congestion control or specific DNN and S-NSSAI based congestion control has to be performed, URSP configuration information may include information indicating whether the corresponding network is an HPLMN (H-SMF) or a VPLMN (V-SMF) or SMF #1 or SMF #2 or another. The URSP configuration information is provided after a policy/configuration of the network/operator is determined. Or to perform S-NSSAI based congestion control or specific DNN and S-NSSAI based congestion control, information indicating whether the corresponding network node is an HPLMN (H-SMF) or a VPLMN (V-SMF) or SMF #1 or SMF #2 or another is preconfigured within the UE or MO or USIM. This information is provided after a policy/configuration of the network/operator is determined.

Afterwards, when S-NSSAI based congestion control or specific DNN and S-NSSAI based congestion control has to be performed and a network node (for example, H-SMF or V-SMF) rejects a PDU session establishment/modification request of the UE, the network node provides an (SM) back-off timer to the UE as in the prior art. At this time, a reject cause value included together may be a cause value indicating insufficient resources (for example, #26) or a new cause value indicating insufficient resources from H-SMF or V-SMF or SMF #1 or SMF #2.

When performing congestion control based on URSP configuration information received in advance or preconfigured S-NSSAI or specific DNN and S-NSSAI based congestion control, the UE performs S-NSSAI based congestion control or specific DNN and S-NSSAI based congestion control based on the information indicating whether the corresponding network node is an HPLMN (H-SMF) or VPLMN (V-SMF) or SMF #1 or SMF #2 or another. In other words, when the information indicates that the network node is a VPLMN (namely, V-SMF), the UE does not make the same PDU session establishment/modification request of associated S-NSSAI and/or DNN until the provided (SM) back-off timer expires in association with allowed S-NSSAI. When the information indicates that the network node is an HPLMN (H-SMF), the UE does not make the same PDU session establishment/modification request of associated S-NSSAI and/or DNN until the provided (SM) back-off timer expires in association with mapped S-NSSAI.

IV. Fourth Disclosure: Default S-NSSAI is Applicable within UE

1. When a Rule within URSP is Matched, and

1-A. When Associated S-NSSAI within HPLMN #A is Mapped to S-NSSAI #2 within a Serving PLMN, The UE may make a traffic transmission request via S-NSSAI #2 (which is mapped to HPLMN #A).

1-B. When Associated S-NSSAI within HPLMN #A is not Mapped to S-NSSAI #2 within a Serving PLMN, The UE may make a traffic transmission request via S-NSSAI #1 (which is mapped to default S-NSSAI #Z).

2. When No Rule within URSP is Matched,

2-A. The UE May Make a Traffic Transmission Request Via S-NSSAI #1 (which is Mapped to the Default S-NSSAI #Z).

V. Embodiments of the First to Fourth Disclosures

Updates on the standard specification TS 24.501 are as follows.

Proposal 1: The specification shall support that multiple pieces of S-NSSAI (for HPLMN) are mapped to one S-NSSAI within a serving PLMN.

Proposal 2: N-to-1 mapping shall not be allowed between S-NSSAI within a serving PLMN and S-NSSAI within an HPLMN.

Proposal 3: The maximum number of S-NSSAI mapped to each S-NSSAI shall not exceed 16.

Proposal 4: The total number of mapped S-NSSAI included within NSSAI shall not exceed 16.

Proposal 5: When a UE does not exist in the HPLMN, information mapped to each S-NSSAI shall be provided.

VI. Fifth Disclosure

In the first to fourth disclosures, access control may be performed so that NAS level congestion control, namely, S-NSSAI based congestion control is performed in conjunction with RAC level congestion control, namely, Unified Access Control (UAC).

When the NAS layer of the UE performs S-NSSAI based congestion control in the first to fourth disclosures, the UE has to perform access control before performing an RRC connection establishment procedure to additionally make the corresponding NAS signaling request in the RRC layer, where, for a specific important service (for example, transmission of emergency/urgent/exception, operator's defined/specific data service, (emergency or normal) voice call, or transmission of delay sensitive data), both of the NAS level congestion control and the access control may be bypassed (or overridden). At this time, information on the specific important service may be preconfigured for the UE (for example, by a management object due to OMA-DM or by USIM or by URSP through the UE configuration update procedure) or may be provided to the UE from the network through a Master Information Block (MIB)/System Information Block (SIB) or NAS level signaling (for example, Registration Request, Registration Update Request, Service Request, or UE Configuration Update) procedure. The NAS layer of the UE provides information on the corresponding special service to the RRC layer as a specific indication or an RRC establishment cause or a specific category. The RRC layer of the UE skips (or bypasses) access control based on the information provided from the NAS layer and the information (for example, skipping access control for a specific service) provided from the network (AN) (via MIB and/or SIB). At this time, even when access to a current cell is blocked and/or the UE is operating by receiving a back-off timer (which is related to S-NSSAI) and information about a cause for rejection from the network, the NAS layer of the UE may perform the NAS signaling request (for example, PDU session establishment/modification request) procedure for session management with regard to the corresponding special service. At this time, the NAS layer provides information on the corresponding special service to the RRC layer as a specific indication or information (for example, an RRC establishment cause or a specific category). At this time, the NAS layer may store a blocked state or back-off timer operation state, and the RRC layer may also store information on the blocked state or back-off timer operation state. (The NAS layer and the RRC layer may operate such that both of the two layers store the state information simultaneously or only one of them stores the state information.)

Meanwhile, in the first to fourth disclosures, when the NAS layer of the UE receives a back-off timer (which is related to S-NSSAI) and information on a cause for rejection from the network while performing S-NSSAI based congestion control, the NAS layer of the UE may provide an indication/information informing the RRC layer that the back-off timer for S-NSSAI based congestion control is operating. Afterwards, the RRC layer does not perform a session management-related RRC (AN) signaling request (for example, RGB setup or N2 signaling update). (However, the RRC layer may perform a mobility management-related RRC (AN) signaling request.) When the back-off timer expires, the NAS layer of the UE may provide a separate alleviation indication/information to the RRC layer of the UE, after which the RRC layer may perform a session management-related RRC (AN) signaling request (for example, DRB setup or N2 signaling request). Otherwise, the NAS layer of the UE may not provide the separate alleviation indication/information to the RRC layer but may transmit a NAS signaling request (for session management) to the RRC layer. Then the RRC layer may consider that implicit congestion control has been relieved and may perform a session management-related RRC (AN) signaling request (for example, DRB setup or N2 signaling request). The operation may be performed for each PDU or (radio) bearer.

In addition, the RRC layer may inform the NAS layer of a access control (UAC) result (for example, success or failure). When access is blocked, a block timer may be operated. At this time, the block timer may be operated for each slice, device type, service type, communication type, specific group, network slice, or slice instance. When access is blocked, the NAS layer is not allowed to perform a new NAS signaling request except for the case when the corresponding special service is started and a NAS signaling request is transmitted accordingly. When the block timer expires while the RRC layer is operating the block timer, alleviation information/indication may be provided to the NAS layer. It is not until the alleviation indication/information is transmitted to the NAS layer that the NAS layer performs S-NSSAI based congestion control with regard to the NAS signaling request for mobility management and/or session management.

VII. Sixth Disclosure

The specifics of the first to fifth disclosures may be combined with each other and implemented in a UE or a network.

The descriptions given above may be implemented by hardware. Implementation details will be described with reference to a related drawing.

Figure 13:
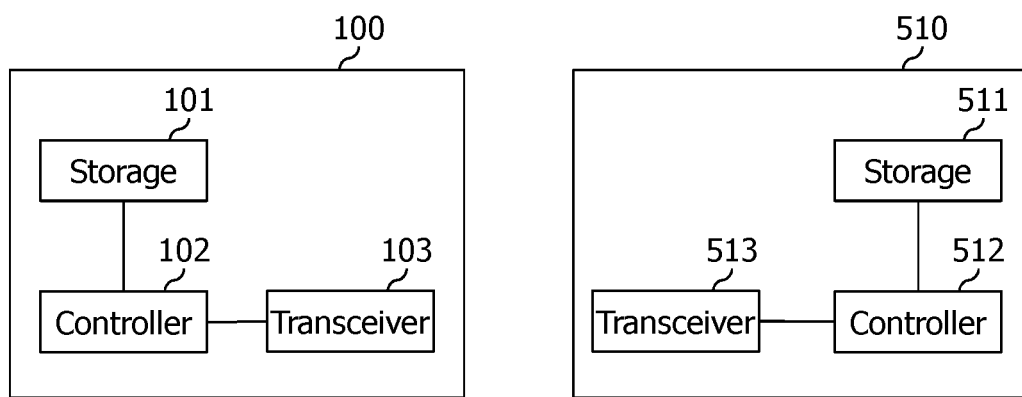
FIG. 13 is a block diagram illustrating structures of a UE and a network node according to an embodiment of the present disclosure.

FIG. 13 is a Block Diagram Illustrating Structures of a UE and a Network Node According to an Embodiment of the Present Disclosure.

As shown in FIG. 13, the UE 100 includes a storage means 101, a controller 102, and a transceiver 103. And the network node may be one of AMF, SMF, NEF, and AR The network node includes a storage means 511, a controller 512, and a transceiver 513.

The storage means stores the method described above.

The controllers control the storage means and the transceivers. Specifically, the controllers execute the methods stored in the respective storage means. And the controllers transmit the signals described above through the transceivers.

In this document, preferred embodiments of the present disclosure have been described, but the technical scope of the present disclosure is not limited only to the specific embodiments. Therefore, the present disclosure may be modified, changed, or updated in various ways within the technical principles and scope defined by the appended claims.

What is claimed is:

1. A method for performing access control by a user equipment (UE), the method comprising:
    performing a registration procedure with an Access and mobility Management Function (AMF) of a Visited Public Land Mobile Network (V-PLMN),
    wherein the registration procedure comprises receiving a registration accept message from the AMF of the V-PLMN, wherein the registration accept message includes i) Allowed Network Slice Selection Assistance Information (NSSAI) and ii) Mapping of the Allowed NSSAI which is information for mapping of each Single NSSAI (S-NSSAI) of the Allowed NSSAI to S-NSSAIs of a Home PLMN (H-PLMN);
    transmitting, to a Session Management Function (SMF) of the V-PLMN, a request message related to a Protocol Data Unit (PDU) session, wherein the request message includes i) an S-NSSAI from the Allowed NSSAI of a current access type, and ii) a corresponding S-NSSAI from the Mapping of the Allowed NSSAI;
    based on an S-NSSAI-based congestion control being applied for the S-NSSAI, receiving, from the SMF of the V-PLMN, a reject message related to the PDU session, wherein the reject message includes i) information on a backoff timer, ii) information informing the UE of either the H-PLMN or the V-PLMN associated with the S-NSSAI and iii) a cause value;
    operating the backoff timer in association with the S-NSSAI; and
    performing the S-NSSAI-based congestion control for the S-NSSAI while the backoff timer is running.

2. The method of claim 1, wherein the reject message further includes information on a Data Network Name (DNN).

3. The method of claim 2, wherein the backoff timer is operated in further association with the DNN, and the access control is performed in further consideration of the DNN.

4. The method of claim 1, further comprising:
    receiving a UE Route Selection Policy (URSP), wherein the URSP includes the information informing the UE of either the H-PLMN or the V-PLMN associated with the S-NSSAI.

5. The method of claim 4, wherein the information informing the UE of either the H-PLMN or the V-PLMN further indicates whether a target network node of the S-NSSAI-based congestion control is a SMF of the H-PLMN or the SMF of the V-PLMN.

6. The method of claim 1, wherein the reject message further includes H-PLMN or V-PLMN information.

7. The method of claim 1, wherein the reject message further includes information about whether a target network node of the S-NSSAI-based congestion control is a SMF of the H-PLMN or the SMF of the V-PLMN.

8. A User Equipment (UE) configured to perform access control, the UE comprising:
    a transceiver; and
    a processor configured to control the transceiver, wherein the processor is further configured to perform:
    a process performing a registration procedure with an Access and mobility Management Function (AMF) of a Visited Public Land Mobile Network (V-PLMN),
    wherein the registration procedure comprises receiving a registration accept message from the AMF of the V-PLMN, wherein the registration accept message includes i) Allowed Network Slice Selection Assistance Information (NSSAI) and ii) Mapping of the Allowed NSSAI which is information for mapping of each Single NSSAI (S-NSSAI) of the Allowed NSSAI to S-NSSAIs of a Home PLMN (H-PLMN);
    a process for transmitting, to a Session Management Function (SMF) of the V-PLMN, a request message related to a Protocol Data Unit (PDU) session, wherein the request message includes i) an S-NSSAI from the Allowed NSSAI of a current access type, and ii) a corresponding S-NSSAI from the Mapping of the Allowed NSSAI;
    a process for receiving, from the SMF of the V-PLMN, a reject message related to the PDU session, based on an S-NSSAI-based congestion control being applied for the S-NSSAI, wherein the reject message includes i) information on a backoff timer, ii) information informing the processor of either the H-PLMN or the V-PLMN associated with the S-NSSAI and iii) a cause value; and
    a process for operating the backoff timer in association with the S-NSSAI and a process for performing the S-NSSAI-based congestion control for S-NSSAI while the backoff timer is running.

9. The UE of claim 8, wherein the reject message further includes information on a Data Network Name (DNN).

10. The UE of claim 9, wherein the backoff timer is operated in further association with the DNN, and the access control is performed in further consideration of the DNN.

11. The UE of claim 9, wherein the processor is configured to receive a UE Route Selection Policy (URSP), wherein the URSP includes information on a target network of access control.

12. The UE of claim 11, wherein the information indicates whether a target network node of the access S NSSAI-based congestion control is a SMF of the H-PLMN or the SMF of the V-PLMN.

13. The UE of claim 8, wherein the reject message further includes H-PLMN or V-PLMN information.

14. The UE of claim 8, wherein the reject message further includes information about whether a target network node of the S-NSSAI-based congestion control is a SMF of the H-PLMN or the SMF of the V-PLMN.

* * * * *